(12) United States Patent
Henning

(10) Patent No.: US 12,321,088 B2
(45) Date of Patent: Jun. 3, 2025

(54) CONTROLLING A PORTABLE ELECTRONIC DEVICE WITH CAMERA

(71) Applicant: FJORDEN ELECTRA A.S., Nesoddtangen (NO)

(72) Inventor: Victor Henning, Nesoddtangen (NO)

(73) Assignee: FJORDEN ELECTRA A.S., Nesoddtangen (NO)

( * ) Notice: Subject to any disclaimer, the term of this patent is extended or adjusted under 35 U.S.C. 154(b) by 239 days.

(21) Appl. No.: 17/917,898

(22) PCT Filed: Apr. 12, 2021

(86) PCT No.: PCT/EP2021/059375
§ 371 (c)(1),
(2) Date: Oct. 7, 2022

(87) PCT Pub. No.: WO2021/205034
PCT Pub. Date: Oct. 14, 2021

(65) Prior Publication Data
US 2023/0140707 A1     May 4, 2023

(30) Foreign Application Priority Data

Apr. 10, 2020 (GB) ..................................... 2005361
Jan. 27, 2021 (GB) ..................................... 2101069

(51) Int. Cl.
*G06F 1/16* (2006.01)
*G03B 17/56* (2021.01)
*A45C 11/00* (2006.01)

(52) U.S. Cl.
CPC ......... *G03B 17/563* (2013.01); *G06F 1/1628* (2013.01); *G06F 1/1632* (2013.01); *A45C 11/002* (2025.01); *A45C 11/003* (2025.01)

(58) Field of Classification Search
CPC ... G06F 1/1628; G06F 1/1632; G03B 17/563; A45C 2011/002; A45C 2011/003
See application file for complete search history.

(56) References Cited

U.S. PATENT DOCUMENTS 4,259,568 A * 3/1981 Dynesen ............. G06F 15/0216
                                                        248/676
5,381,179 A    1/1995 Kashimura
(Continued)

FOREIGN PATENT DOCUMENTS

CN    205670784 U    11/2016
CN    206042073 U     3/2017
(Continued)

OTHER PUBLICATIONS

PCT International Search Report and Written Opinion, mailed Sep. 9, 2021, for PCT Application No. PCT/EP2021/059375, 25 pages.
(Continued)

*Primary Examiner* — Adrian S Wilson
(74) *Attorney, Agent, or Firm* — Dorsey & Whitney LLP

(57) ABSTRACT

The present invention relates to an accessory for controlling a camera incorporated into a portable electronic device, such as a smartphone. The accessory comprises a controller configured to control the camera. The controller may be configured to initiate camera control by sending a camera control command to the portable electronic device. Alternatively, a user may initiate a camera mode on the portable electronic device and the accessory may then be used to control the camera. The accessory may comprise a reconfigurable camera grip or removable camera controls, whereby portable electronic devices such as smartphones can then be gripped and operated by a user similar to traditional cameras.

19 Claims, 21 Drawing Sheets

(56) References Cited

U.S. PATENT DOCUMENTS

| | | | | |
|---|---|---|---|---|
| 5,732,928 A * | 3/1998 | Chang | | G06F 3/0208 |
| | | | | 248/676 |
| 8,162,282 B2 * | 4/2012 | Hu | | F16M 11/10 |
| | | | | 248/447 |
| 8,244,299 B1 * | 8/2012 | Bishop | | H04M 1/0281 |
| | | | | 455/556.1 |
| 8,297,440 B2 * | 10/2012 | Schmidt | | F16M 11/10 |
| | | | | 206/320 |
| 8,374,657 B2 * | 2/2013 | Interdonato | | H04B 1/385 |
| | | | | 455/344 |
| 8,550,317 B2 * | 10/2013 | Hyseni | | A45F 5/00 |
| | | | | 224/217 |
| D697,069 S * | 1/2014 | Tak | | D14/447 |
| 8,746,448 B1 * | 6/2014 | Bellace | | A45F 5/00 |
| | | | | 224/217 |
| 8,843,177 B2 | 9/2014 | Mori et al. | | |
| 8,978,883 B2 * | 3/2015 | Gandhi | | A45C 11/00 |
| | | | | 206/45.24 |
| 8,985,543 B2 * | 3/2015 | Chen | | F16M 11/10 |
| | | | | 206/45.24 |
| 9,185,954 B2 * | 11/2015 | Cheung | | H04B 1/3877 |
| 9,332,170 B1 | 5/2016 | Khalili | | |
| 9,372,507 B2 * | 6/2016 | Dekock | | G06F 1/1626 |
| 9,535,453 B2 * | 1/2017 | Dong | | G06F 1/1626 |
| 9,683,694 B2 * | 6/2017 | Shiba | | F16M 11/10 |
| 9,717,314 B2 * | 8/2017 | Idehara | | G06F 1/1626 |
| 9,729,770 B2 | 8/2017 | Barros et al. | | |
| 9,768,822 B1 * | 9/2017 | Loh | | H04M 1/185 |
| 9,918,545 B2 * | 3/2018 | van Hooft | | F16B 1/00 |
| 10,003,370 B2 | 6/2018 | Fathollahi | | |
| 10,063,272 B1 * | 8/2018 | Yeo | | A45F 5/00 |
| 10,213,010 B2 * | 2/2019 | Pearce | | B25G 1/102 |
| 10,441,064 B2 * | 10/2019 | Watkins | | A45F 5/00 |
| 10,455,927 B2 * | 10/2019 | Brousseau | | B25G 3/00 |
| 10,462,641 B2 | 10/2019 | Baldree | | |
| 10,574,284 B1 * | 2/2020 | Winston | | A45F 5/00 |
| D877,154 S * | 3/2020 | Hummel | | D14/447 |
| D905,040 S * | 12/2020 | Altschul | | H04B 1/3888 |
| | | | | D14/251 |
| 11,388,966 B2 * | 7/2022 | Balmer | | F16M 13/04 |
| 11,553,771 B2 * | 1/2023 | Yoon | | H04B 1/385 |
| 2003/0213886 A1 * | 11/2003 | Gilbert | | F16M 11/10 |
| | | | | 248/454 |
| 2004/0134812 A1 * | 7/2004 | Yeh | | A45C 5/03 |
| | | | | 206/320 |
| 2005/0205623 A1 * | 9/2005 | Buntain | | A45F 5/00 |
| | | | | 224/217 |
| 2007/0029116 A1 | 2/2007 | Keshavan | | |
| 2007/0163897 A1 * | 7/2007 | Lee | | B42F 7/02 |
| | | | | 206/45.24 |
| 2007/0291166 A1 * | 12/2007 | Misawa | | G03B 17/02 |
| | | | | 348/376 |
| 2011/0309117 A1 * | 12/2011 | Roberts | | H04M 1/04 |
| | | | | 224/217 |
| 2012/0299318 A1 * | 11/2012 | Murphy | | A45F 5/00 |
| | | | | 294/25 |
| 2014/0267891 A1 | 9/2014 | Adams | | |
| 2014/0332418 A1 * | 11/2014 | Cheung | | H04B 1/3877 |
| | | | | 206/45.2 |
| 2015/0011269 A1 * | 1/2015 | Liu | | H04M 1/0202 |
| | | | | 455/575.1 |
| 2015/0092346 A1 * | 4/2015 | Ben | | G06F 1/1626 |
| | | | | 248/688 |
| 2015/0116508 A1 | 4/2015 | Ito et al. | | |
| 2015/0172431 A1 * | 6/2015 | Huang | | H04B 1/3883 |
| | | | | 455/575.8 |
| 2015/0365590 A1 | 12/2015 | Ishizuka | | |
| 2015/0375894 A1 * | 12/2015 | Idehara | | A45C 11/00 |
| | | | | 206/45.24 |
| 2016/0157368 A1 * | 6/2016 | Dong | | G06F 1/1626 |
| | | | | 361/679.01 |
| 2016/0286016 A1 * | 9/2016 | Lee | | H04M 1/04 |
| 2017/0195535 A1 | 7/2017 | Schofield | | |
| 2017/0328514 A1 * | 11/2017 | Cavalcante | | F16M 13/00 |
| 2018/0097989 A1 | 4/2018 | Stoops | | |
| 2018/0338022 A1 | 11/2018 | Penfold | | |
| 2019/0075235 A1 | 3/2019 | Henry et al. | | |
| 2019/0116247 A1 * | 4/2019 | Giles | | B65H 75/4421 |
| 2020/0028951 A1 * | 1/2020 | Hummel | | H04M 1/04 |
| 2021/0365065 A1 * | 11/2021 | Chuang | | G06F 1/1656 |
| 2022/0317737 A1 * | 10/2022 | Ding | | H04M 1/0279 |

FOREIGN PATENT DOCUMENTS

| | | |
|---|---|---|
| CN | 206100128 U | 4/2017 |
| CN | 206341277 U | 7/2017 |
| CN | 210266451 U | 4/2020 |
| EP | 3226541 A1 | 10/2017 |
| EP | 3420709 B1 | 2/2020 |
| JP | 3220346 U | 2/2019 |
| KR | 200490786 Y1 | 1/2020 |
| WO | 0204251 A1 | 1/2002 |
| WO | 2013058938 A1 | 4/2013 |
| WO | 2017156555 A1 | 9/2017 |
| WO | 2018099289 A1 | 6/2018 |

OTHER PUBLICATIONS

United Kingdom Intellectual Property Office, "First Search Report," mailed Oct. 8, 2020, for U.K. Application No. GB2005361.7, 5 pages.

United Kingdom Intellectual Property Office, "Second Search Report," mailed Apr. 20, 2021, for U.K. Application No. GB2005361.7, 3 pages.

United Kingdom Intellectual Property Office, "Search Report," mailed Sep. 20, 2021, for U.K. Application No. GB2101069.9, 7 pages.

European Patent Office, "Communication pursuant to Article 94(3) EPC," mailed Aug. 30, 2024, in European Patent Application No. 21718548.7, 10 pages.

* cited by examiner

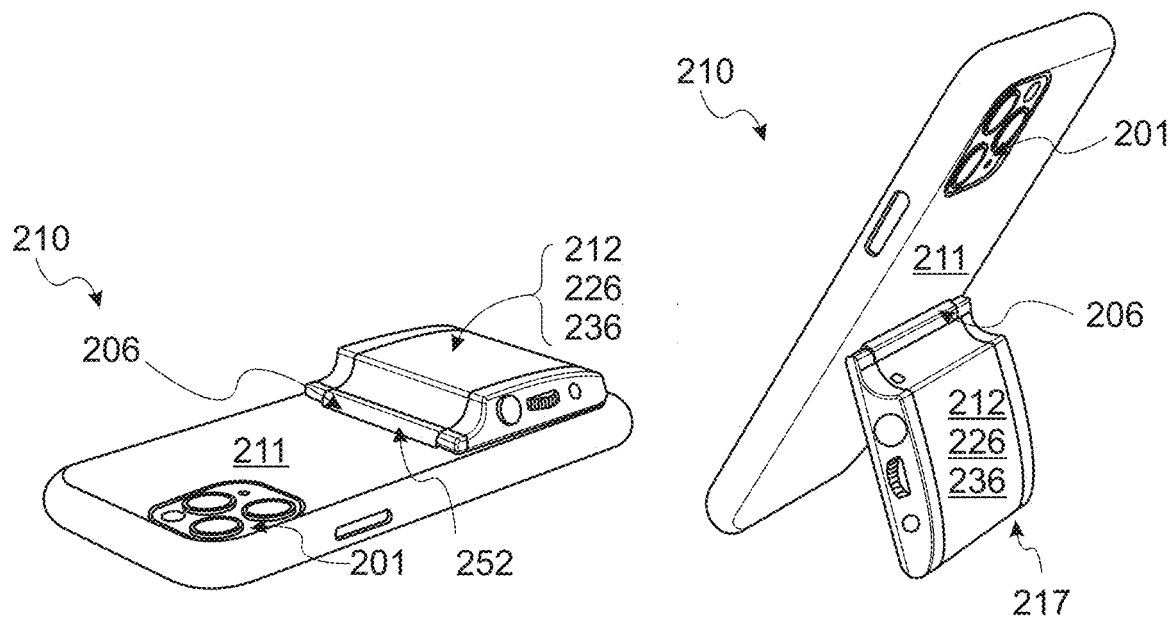
Fig. 18
Fig. 19
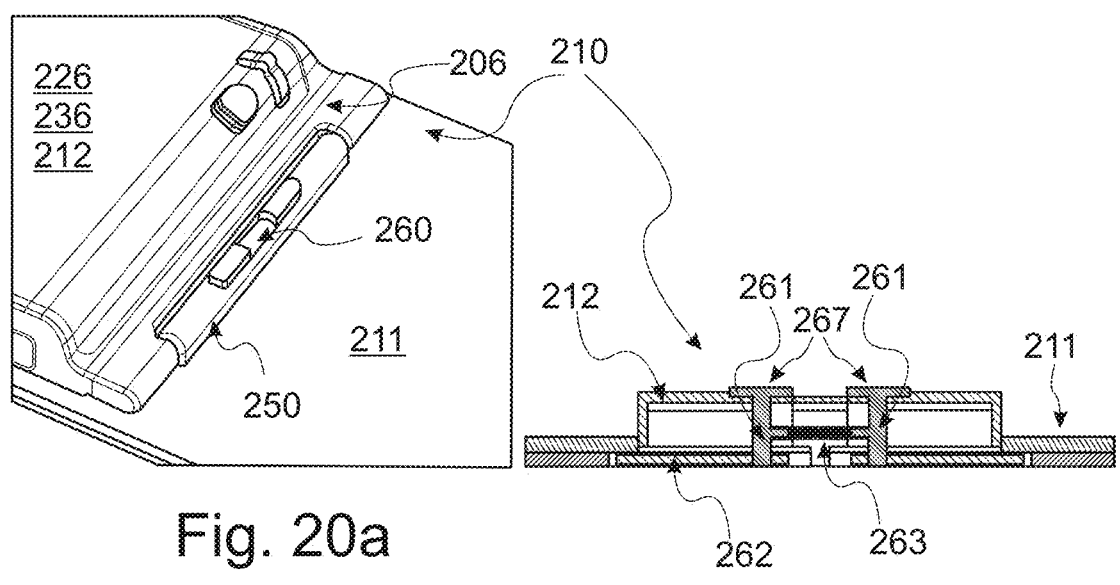
Fig. 20a
Fig. 20b

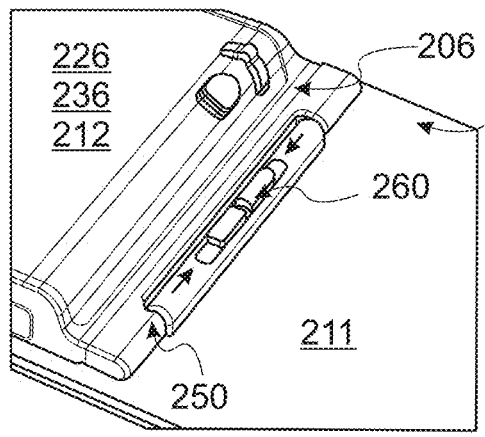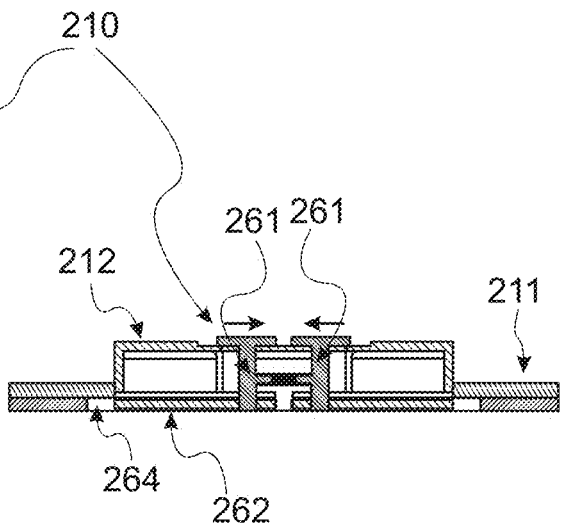
Fig. 21a
Fig. 21b
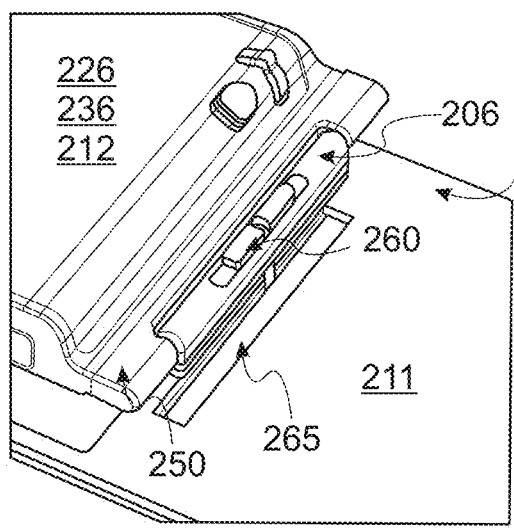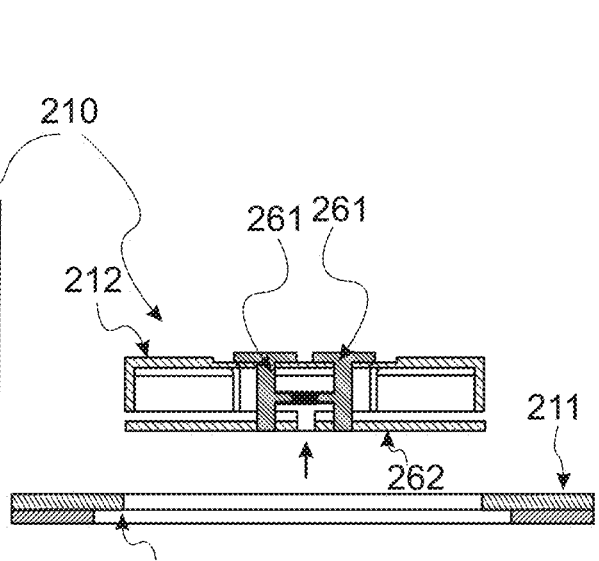
Fig. 22a
Fig. 22b

CONTROLLING A PORTABLE ELECTRONIC DEVICE WITH CAMERA

TECHNICAL FIELD

The present invention relates to controlling a portable electronic device that has a camera incorporated in the device. More particularly, the present invention relates to controlling a camera smartphone.

BACKGROUND

Smartphones are a popular type of portable electronic device, and usually incorporate one or more cameras. Other portable electronic devices, such as tablets and laptops, may also incorporate one or more cameras. There has been a trend in recent years to provide such devices with cameras of ever-increasing specification and performance. Yet, users still report significant gaps in picture-taking experience when using these devices compared to traditional cameras.

The present invention provides improvements related to controlling a portable electronic device with camera, such as a smartphone.

Overview

This overview introduces concepts that are described in more detail in the detailed description. It should not be used to identify essential features of the claimed subject matter, nor to limit the scope of the claimed subject matter.

According to a first aspect of the present disclosure, there is provided an accessory for controlling a camera incorporated into a portable electronic device, the accessory comprising:

two or more assemblable components, wherein at least one of said assemblable components is provided in the form of, or comprises, a case for the portable electronic device, and at least one other of said components comprises:

one or more portions reconfigurable to provide a camera grip and/or a kickstand for the portable electronic device; and, a controller configured to control the camera. The accessory thus provides improved grip and/or control and/or support for the camera of the portable electronic device.

The accessory may further comprise one or more camera controls for controlling the camera. The one or more camera controls may be operably connected to the controller.

The one or more reconfigurable portions may be configured to reconfigure between a first, stowed position and a second, deployed position which provides the camera grip. Accordingly, the camera grip may be provided by a single reconfigurable portion, or by a number of reconfigurable portions collectively.

At least one other of said two or more assemblable components may comprise said controller and/or said one or more reconfigurable portions and/or said one or more camera controls. There may be, for example, three assemblable components, one comprising the case, one comprising the controller and one comprising the one or more camera controls and/or the one or more reconfigurable portions. Each camera control, or reconfigurable portion, however, may be provided as an individual, assemblable component. The part provided in the form of, or comprising, the case may further comprise the one or more reconfigurable portions.

According to a second aspect of the present disclosure, there is provided an accessory (ie, a camera control module) for controlling a camera incorporated into a portable electronic device, the accessory comprising:

a controller configured to control the camera and/or one or more camera controls for controlling the camera;

wherein the accessory is configured to be attached to a case for the portable electronic device. The accessory can thus be adapted to control different portable electronic devices, each requiring a different case.

The accessory may further comprise said case.

A kit of parts may comprise said accessory and multiple cases. The multiple cases may be in accordance with a same case design (eg, the cases will each fit a given model and/or make of portable electronic device). Alternatively, the multiple cases may be in accordance with different case designs (eg, the cases will fit different models and/or makes of portable electronic device).

The accessory may comprise the controller and the one or more camera controls. The one or more camera controls may be operably connected to the controller. Otherwise, the operable connection between the controller and the one or more camera controls may be established by attachment of the accessory to the case (for example, by completing a suitable electric or electronic circuit). Accordingly, the case may comprise a portion of an electric or electronic circuit for establishing said operable connection.

The accessory may further comprise an attachment sensor for sensing attachment of the accessory or any parts thereof, such as the controller and/or the one or more camera controls, to the case.

Although different sensors and sensing principles may be used, the attachment sensor may advantageously comprise an NFC tag or an NFC reader configured to interact, respectively, with an associated NFC reader or an associated NFC tag of the portable electronic device, or of the case for the portable electronic device.

The attachment sensor may alternatively or additionally comprise, or be configured to sense, at least one magnet and/or a switch. For example, an interaction between the at least one magnet and the sensor may be used, or actuation of the switch may be used, for sensing an attachment event. While it is possible to use a single sensor, it may be preferable to provide a degree of redundancy by employing two or more attachment sensors.

The accessory may comprise one or more portions reconfigurable between a first, stowed position and second, deployed position. Accordingly, the accessory may be configured in at least one compact, storage configuration that minimises space. This may be useful, for example if the portable electronic device is a smartphone, when the device is used as a telephone, or in a non-camera mode.

In the second, deployed position at least one of the one or more reconfigurable portions may be configured to provide a camera grip for the portable electronic device. This configuration of the accessory may provide improved gripping for the portable electronic device for use as a camera.

Concepts that may equally be applied to the first or second aspect of the disclosure presented above will now be introduced:

The controller may be configured to communicate wirelessly with the portable electronic device.

The accessory may comprise a Bluetooth® transmitter and/or an NFC transmitter.

These transmitters may be provided as part of, ie integral with, the controller.

The controller may be configured to communicate with the portable electronic device, such that actuation of the one or more camera controls causes the accessory to communicate with the portable electronic device via the controller, thereby causing the camera to perform one or more actions associated with the one or more camera controls.

The case may define at least one of a slot, recess or a window for receiving the accessory or any one or more of its assemblable components, such as the controller and/or the one or more camera controls and/or the one or more reconfigurable portions. However, multiple slots, recesses or windows may be provided, in any combination, for receiving any assemblable features. For example, each camera control may be received in a respective slot, recess or window. For example, the controller may be received in a respective slot and the one or more camera controls may collectively be received, as a single camera control module, in a respective recess.

The case may comprise, or be provided in the form of, a protective casing element for a camera smartphone. Such protective casing element may comprise, or be made of, a resiliently deformable material, such as a rubber or a plastic.

The one or more camera controls may comprise one or more of:
  a shutter button;
  a combined two-step focus-and-shutter button;
  a camera settings function button;
  a camera settings function dial;
  a zoom rocker lever; and,
  a zoom dial.

Said one or more of:
  a shutter button;
  a combined two-step focus-and-shutter button;
  a camera settings function button;
  a camera settings function dial;
  a zoom rocker lever; and,
  a zoom dial,
may be provided on a control panel.

The accessory may comprise a reconfiguration sensor for sensing reconfiguration of the one or more reconfigurable portions. The reconfiguration sensor may permanently be operably connected to the controller. Otherwise, the reconfiguration sensor may become operably connected to the controller by attachment of the accessory to the case.

The reconfiguration sensor may comprise an NFC tag and/or an NFC reader.

The reconfiguration sensor may alternatively or additionally comprise, or be configured to sense, at least one magnet and/or a switch. For example, an interaction between the at least one magnet and the sensor may be used, or actuation of the switch may be used, for sensing a reconfiguration event.

In the second, deployed position at least one of the one or more reconfigurable portions may be configured to reveal the control panel.

The one or more reconfigurable portions may comprise the control panel.

The control panel may be configured to rotate and/or translate, for example by way of sliding.

The accessory may be configured such that reconfiguration of the control panel instigates reconfiguration to the second, deployed position of at least one other of the one or more reconfigurable portions.

The accessory may alternatively or additionally be configured such that reconfiguration to the second, deployed position of at least one other of the one or more reconfigurable portions instigates reconfiguration of the control panel.

The control panel may be directly or indirectly connected to said at least one other of the one or more reconfigurable portions via a linkage. The linkage may comprise any number of links, which may each be provided in the form of a rod, lever or a tab—or any other suitable linking element. Each link may be mechanically connected to one or more other links via a suitable connector that allows relative movement of the connected links.

In the first, stowed position the control panel may be configured to be at least partially hidden. Accordingly, the one or more camera controls provided on the control panel may be configured, when the control panel is in this position, to be non-actuatable by a user of the accessory.

The one or more reconfigurable portions may comprise a flexible element.

The accessory may further comprise a support structure for supporting the flexible element.

The flexible element may be generally shaped, in its first, stowed position, as a quadrilateral with parallel opposed sides. Adjacent corners of said quadrilateral may be constrained by the support structure to displace in unison along parallel guides of said support structure, which are parallel to opposed sides of said quadrilateral. Accordingly, displacement of said corners along said parallel guides may be configured to result into reconfiguration of the flexible element into the camera grip.

The flexible element may be reconfigurable to define a loop. The loop may define a finger loop, that is a loop for passing therein a finger of a user of the accessory, for supporting or holding the device. Alternatively, the loop may define a hand loop.

The opposed pairs of corners of the flexible element may be constrained such that the loop can be defined at different positions along the parallel guides of the support structure.

The one or more reconfigurable portions may comprise one or more hinges.

At least one of said one or more hinges may be a live and/or a film hinge, that is a type of hinge obtained from folding a sheet of material or any other planar structure, without necessitating any further parts.

The flexible element may be in the form of a concertina-type element. The concertina-type, flexible element may comprise a plurality of elongated elements interconnected along respective long sides by respective live hinges. Alternatively, the hinges may comprise respective hinge pins.

The accessory may be configured such that reconfiguration of at least one of the one or more reconfigurable portions causes the accessory (more particularly, the controller) to send a control command to the portable electronic device, which command can for example be a command for initiating camera control using the accessory, for example a command for initiating a camera mode on the portable electronic device. Once camera control via the accessory is initiated, a user may actuate the one or more camera controls to control the camera of the portable electronic device as required.

The accessory may be configured such that reconfiguration of at least one of the one or more reconfigurable portions causes the accessory (more particularly, the controller) to receive a control command, for example from the reconfiguration sensor, or from the portable electronic device, which command can for example be a command for initiating camera control using the accessory, for example a wake up command for awaking the controller from a controller sleep mode. Once camera control via the accessory is initiated, a user may actuate the one or more camera controls to control the camera of the portable electronic device as required.

The accessory may be configured such that actuation of at least one of the one or more camera controls causes the accessory (more particularly, the controller) to send or receive such control commands.

The accessory may be configured such that assemblage of the accessory (if the accessory comprises assemblable parts) and/or installation of the accessory to the portable electronic device causes the accessory (more particularly, the controller) to send or receive such control commands.

The portable electronic device may be in the form of a camera smartphone.

The accessory may comprise just two or just three assemblable components, which may be simple and user-friendly to assemble.

One of said assemblable components may be provided in the form of, or may comprise, said case.

One other assemblable component may comprise said one or more reconfigurable portions and said controller.

The two or three assemblable components may comprise a connector for assembling the assemblable components.

The connector may be provided as a part of one of the two assemblable components, or may be the third assemblable component.

The one other assemblable component may comprise one and only one reconfigurable portion. This may make the accessory particularly compact and ergonomic.

The controller may be accommodated within said single reconfigurable portion. Preferably, the controller is fully encapsulated into a or the reconfigurable portion, and is thus normally not visible or accessible by the user.

The reconfigurable portion may be generally shaped as a parallelepiped, and preferably as a parallelepiped with right angles.

The reconfigurable portion may have a width that generally corresponds to, or is less than, a width of the case or of the portable electronic device, wherein said widths may be in a transversal direction of the portable electronic device.

The reconfigurable portion may have a length that generally corresponds to half, or less than half, a length of the case or of the portable electronic device, wherein said lengths may be in a longitudinal direction of the portable electronic device.

The reconfigurable portion may have a depth that generally corresponds to, or exceeds, a depth of the case or of the portable electronic device, wherein said depths may be in an out-of-plane direction of the portable electronic device.

The reconfigurable portion or portions, therefore, may be shaped and constructed to resemble a traditional camera grip, and said camera grip may be reconfigured to provide a camera grip in landscape mode or in portrait mode, with respect to the portable electronic device.

The connector and the one or more reconfigurable portions may be hinged together, such that the one or more reconfigurable portions may be rotated away from the case. This provides for a particularly simple operation by the user. The one or more reconfigurable portions may be rotated back toward the case, to store away the camera grip and/or the kickstand. Alternatively, a hinge may be provided as part of the one or more reconfigurable portions.

The one or more reconfigurable portions may be rotated away from the case and click at selectable, predetermined angles of rotation, to retain said selectable, predetermined angles of rotation. For example, a click mechanism may be provided as part of a or the hinge connecting the connector with the one or more reconfigurable portions, as known in the arts.

The one or more reconfigurable portions may be rotated away from the case up to a maximum angle of rotation of less than 90 degrees, or less than 60 degrees.

The connector may comprise one or more projections, such as bayonet projections, for connecting to respective one or more sockets, such as bayonet sockets, provided on the case. However, alternatives are possible; for example, the connector may connect to the case magnetically. This magnetic connection may not exclude the simultaneous provision of projections and sockets as described herein. The location of the projections and sockets may be swapped between the case and the connector, depending on design requirements. However, it is preferred that the sockets be provided on the case, and that the case be made from a material which may not interfere with wireless charging of the portable electronic device, such as a glass or a plastic.

The one or more sockets may be located generally centrally with respect to the case of the portable electronic device.

The one or more bayonet projections and bayonet sockets may be designed such that said one other assemblable component is connectable to the case by inserting the one or more bayonet projections in the respective one or more bayonet sockets and by twisting the other assemblable component relative to the case Said twisting may comprise rotating the other assemblable component relative to the case by at least 30 degrees.

Alternatively, said projections may be spring biassed, and said projections and sockets may be designed such that said one other assemblable component is connectable to the case by actuating a release mechanism against a spring bias, then inserting the one or more projections in the respective one or more sockets and then releasing said release mechanism.

A back face of the case may be recessed to accommodate at least partially the reconfigurable portion(s) in a/the stowed-away configuration.

The case may comprise inner and outer shells. The connector may be formed integrally with, be a part of, or comprise the case outer shell.

The connector may comprise a tongue for insertion into a corresponding slot formed on a side of the one or more reconfigurable portions, for connecting the connector with the one or more reconfigurable portion.

Said connection may be permanent, or it may be undone by the user, so that the one or more reconfigurable portions, including the controller, may be removed and used as a remote camera control for controlling the camera of the portable electronic device. According to a further aspect of the present disclosure, there is provided a method of controlling a camera incorporated into a portable electronic device using an accessory as described herein, the method comprising:

receiving a camera control command from the portable electronic device, for example a camera control initiation command for initiating camera control using the accessory, such as a controller wake-up command for awaking the controller from a sleep mode, or a controller handover command for handing over control of the camera to the controller, and thus to the accessory.

Any reconfigurable portions described herein may comprise one or more configuration retention features, such as one or more camera-grip configuration retention (or stabilisation) features. When the accessory does not comprise any reconfigurable portions (ie, when the accessory is accordingly to the above-mentioned second aspect of the disclosure), then the accessory may itself be provided with one or more configuration retention features, for example to retain the accessory in position on the case.

According to a further aspect of the present disclosure, there is provided a method of controlling a camera incorporated into a portable electronic device using an accessory as described herein, the method comprising:

sending a camera control command to the portable electronic device, for example a camera control initiation command for initiating camera control using the controller and thus the accessory, such as a camera-mode initiation command.

According to a further aspect of the present disclosure, there is provided a computer storage medium comprising computer-readable instructions for causing a portable electronic device incorporating a camera as described herein to send a camera control command as described herein to an accessory as described herein.

According to a further aspect of the present disclosure, there is provided a computer storage medium comprising computer-readable instructions for causing an accessory as described herein to send a camera control command as described herein to a portable electronic device as described herein.

According to a further aspect of the present disclosure, there is provided a portable electronic device incorporating a camera, the device comprising a computer storage medium as described herein.

According to a further aspect of the present disclosure, there is provided an accessory as described herein, the accessory comprising a computer storage medium as described herein.

DRAWINGS

Illustrative implementations will now be described, by way of example only, with reference to the drawings. In the drawings.

Figure 4:
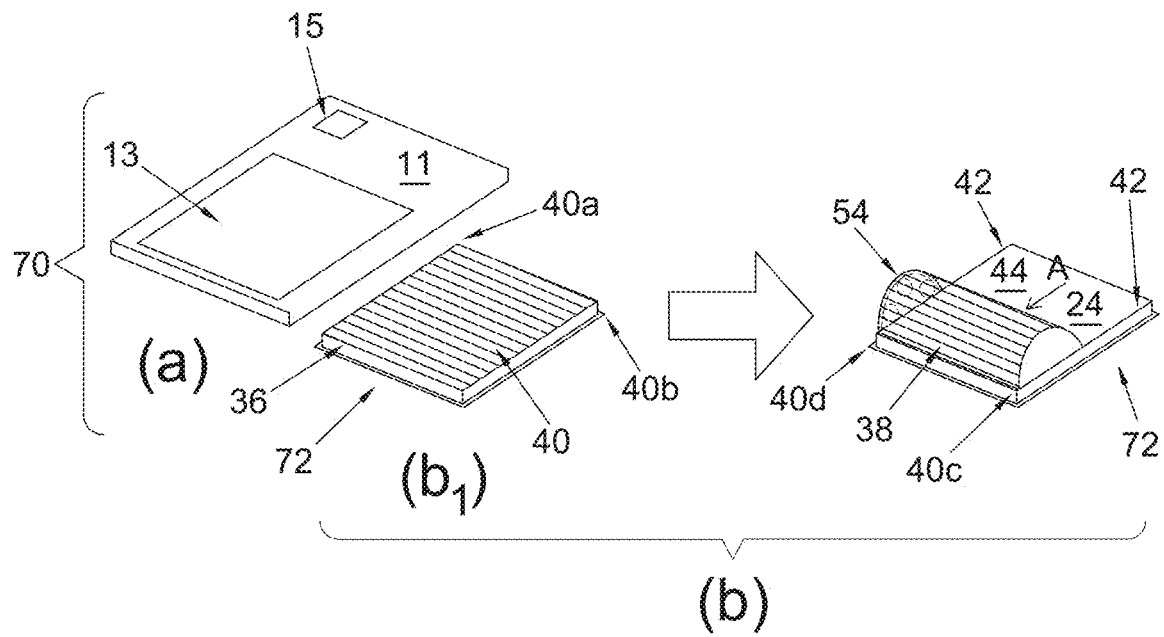
FIG. 4 is a schematic perspective view of another two-part accessory for a camera smartphone comprising: (a) a smartphone case; and, (b) a camera control module with a reconfigurable grip and a reconfigurable control panel, represented ($b_1$) in a stowed-away configuration, and ($b_2$) in a deployed configuration.
Figure 5:
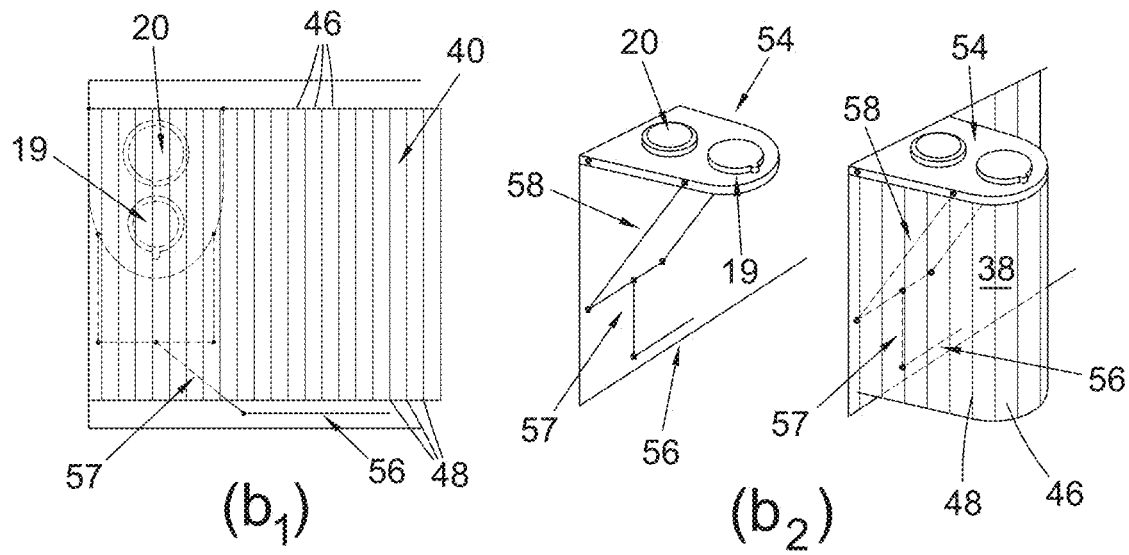
Figure 6:
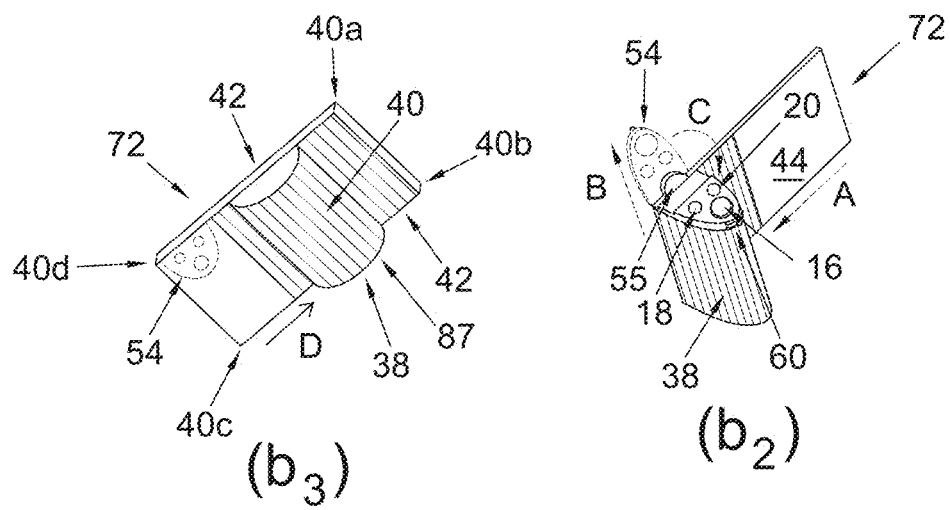
Figure 7:
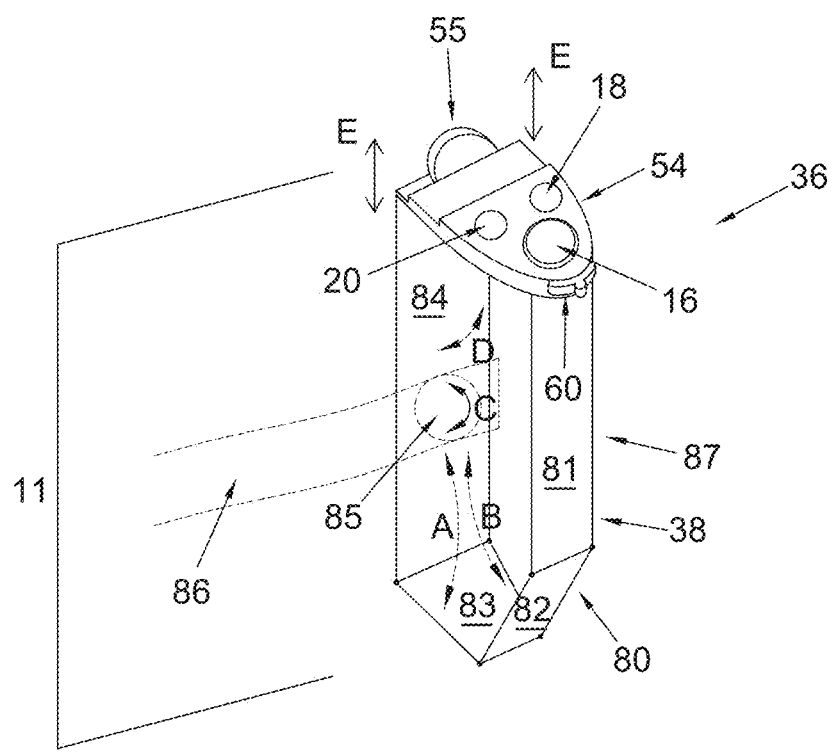
Figure 8:
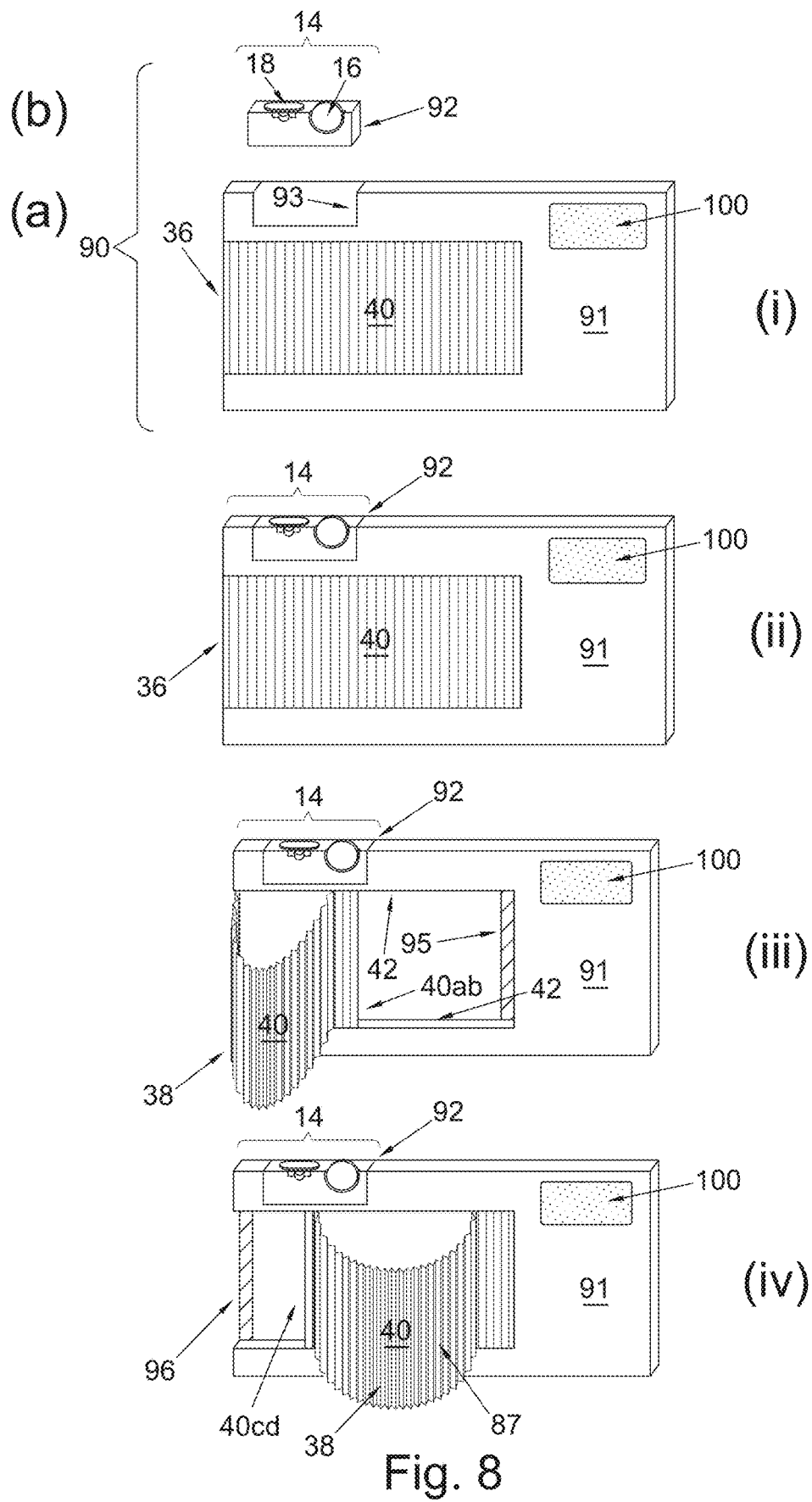
Figure 9:
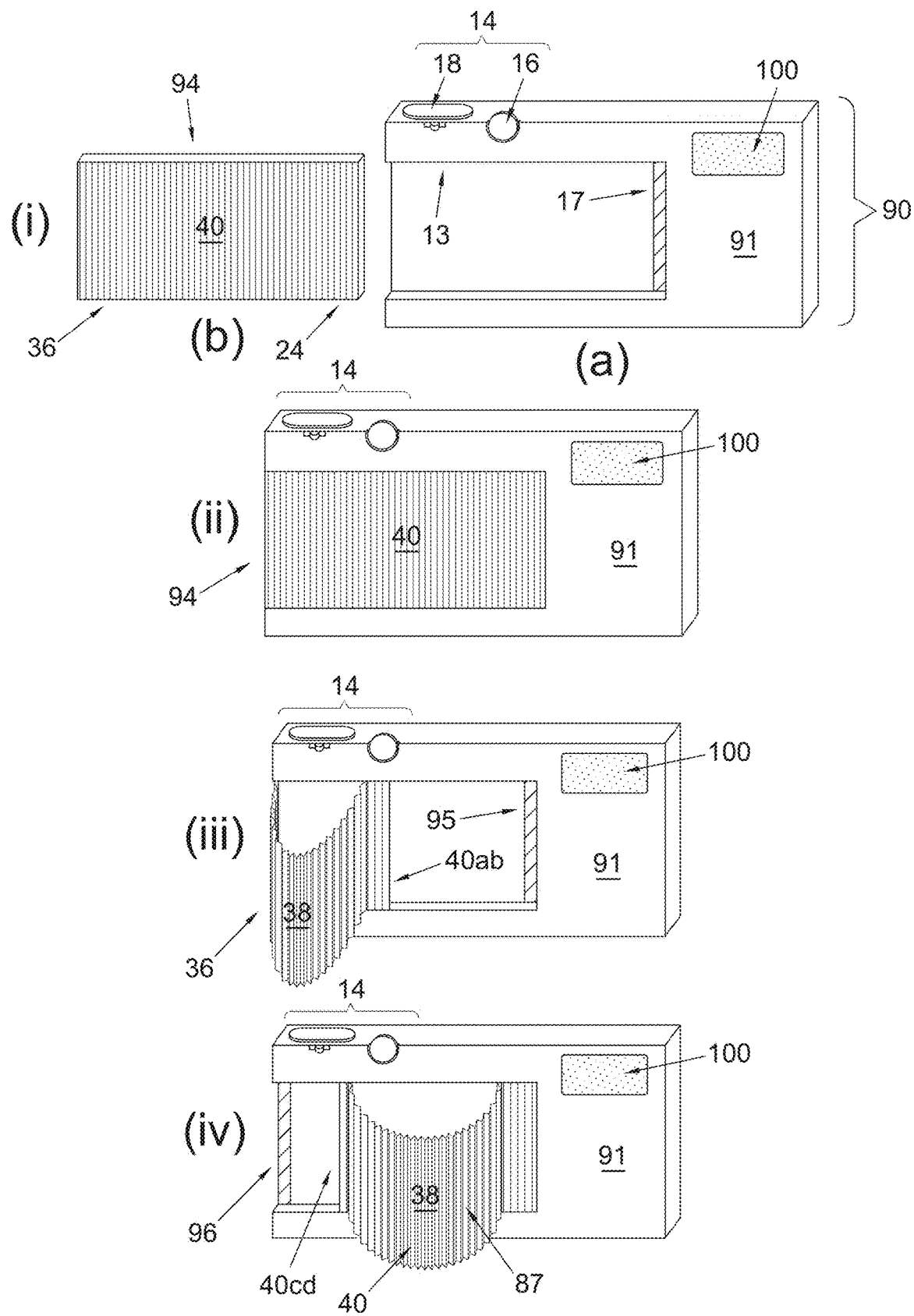
Figure 10:
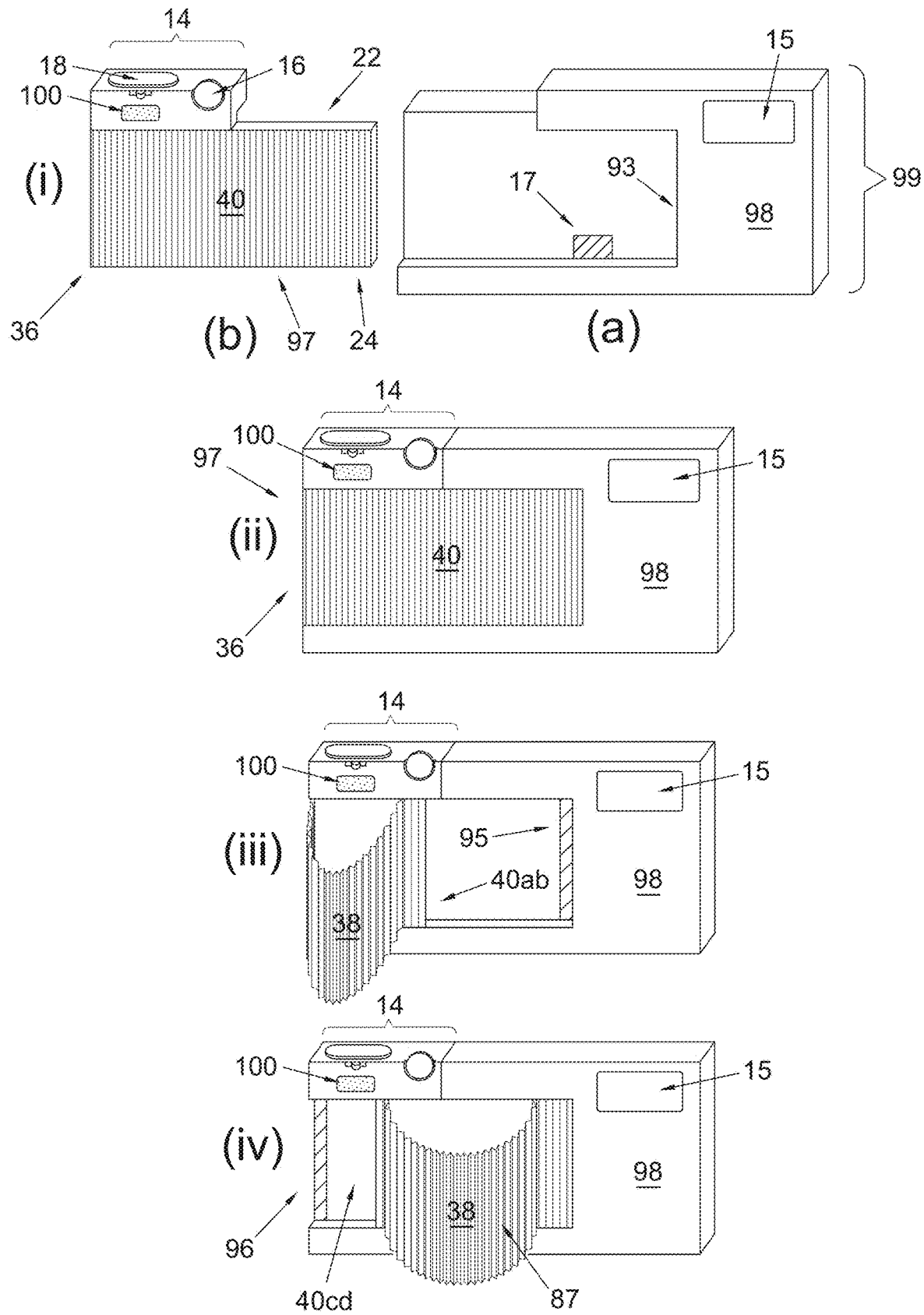
Figures 11A, 11B:
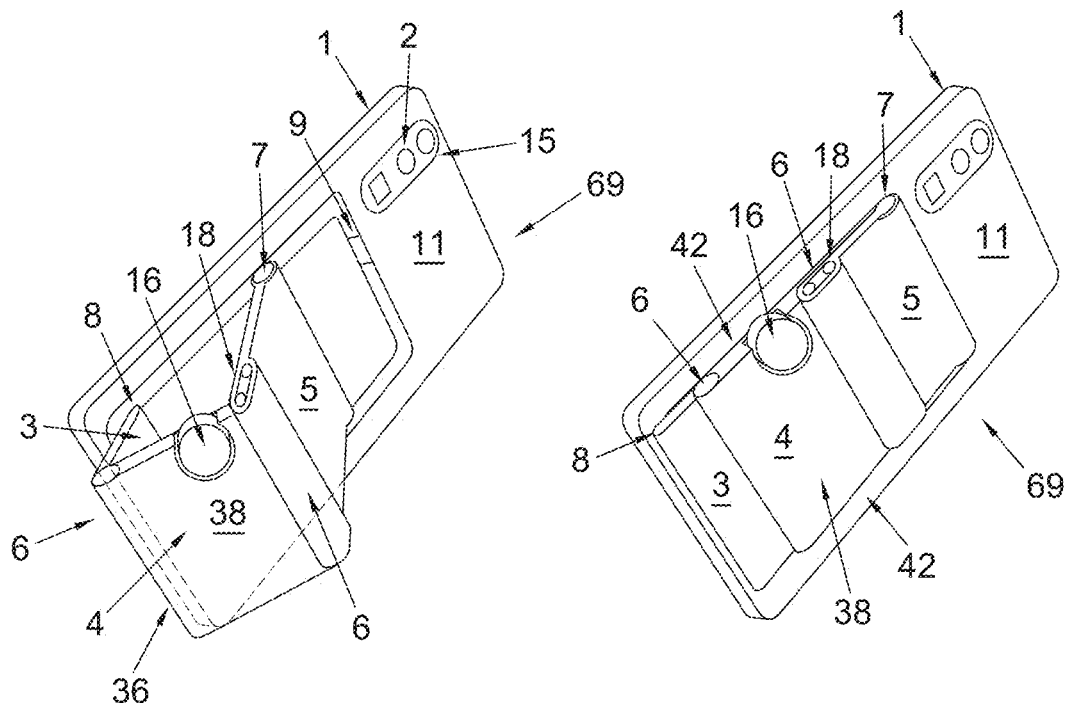
Figure 12:
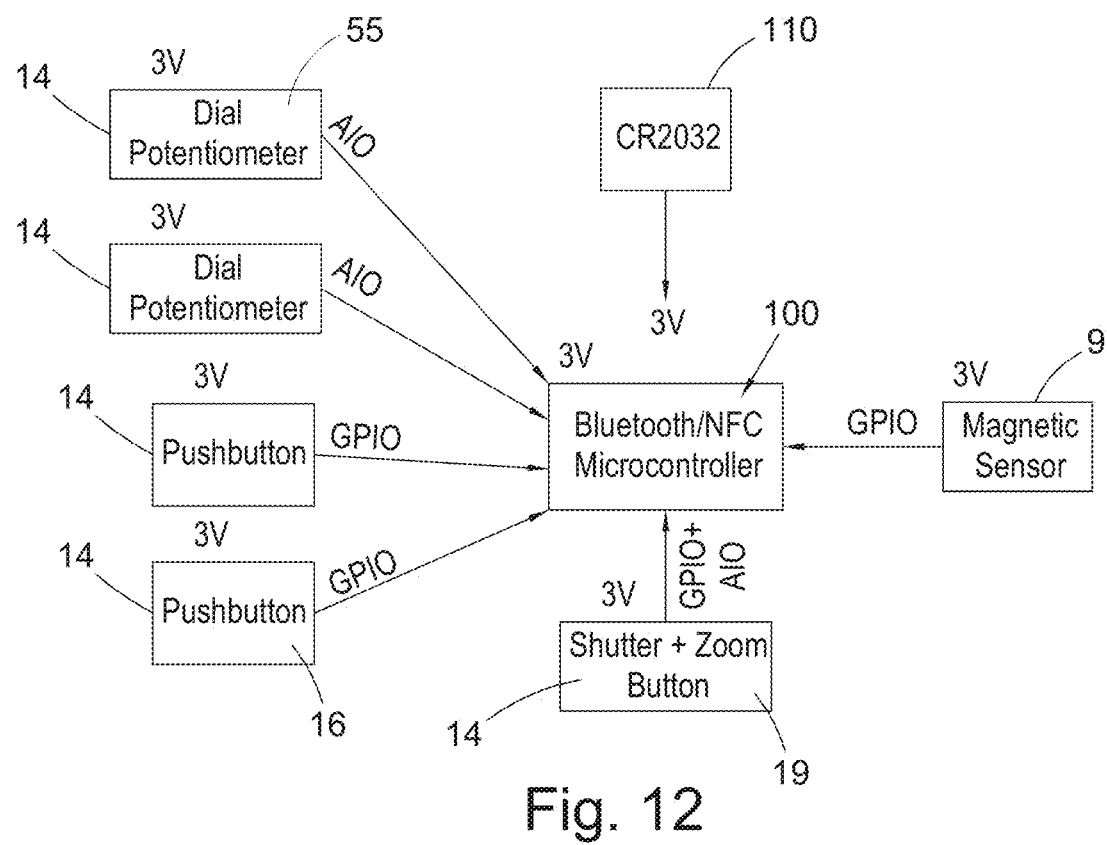
Figure 13:
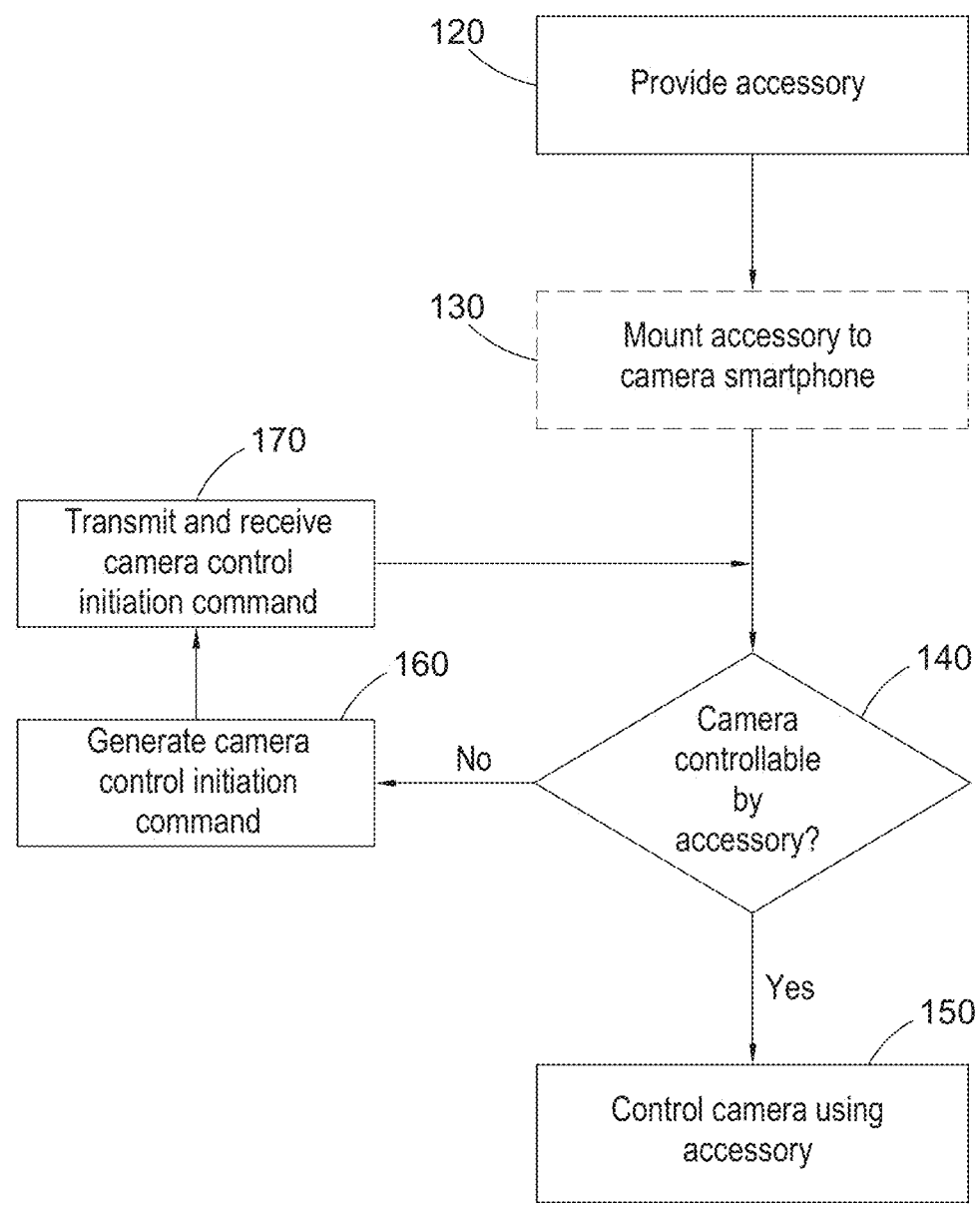
Figure 14:
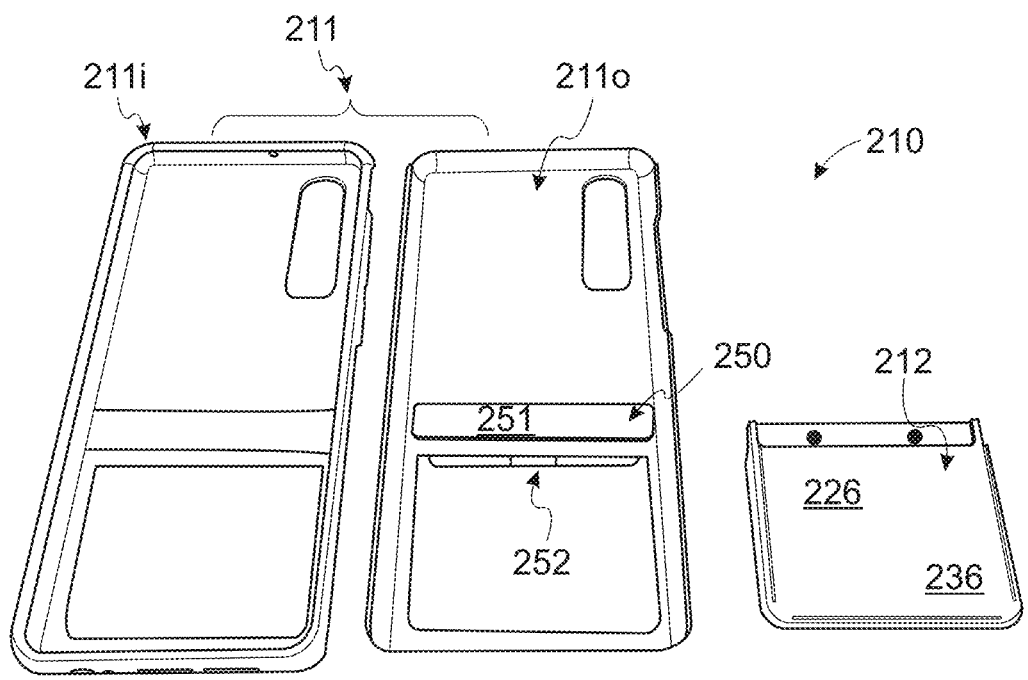
Figure 15:
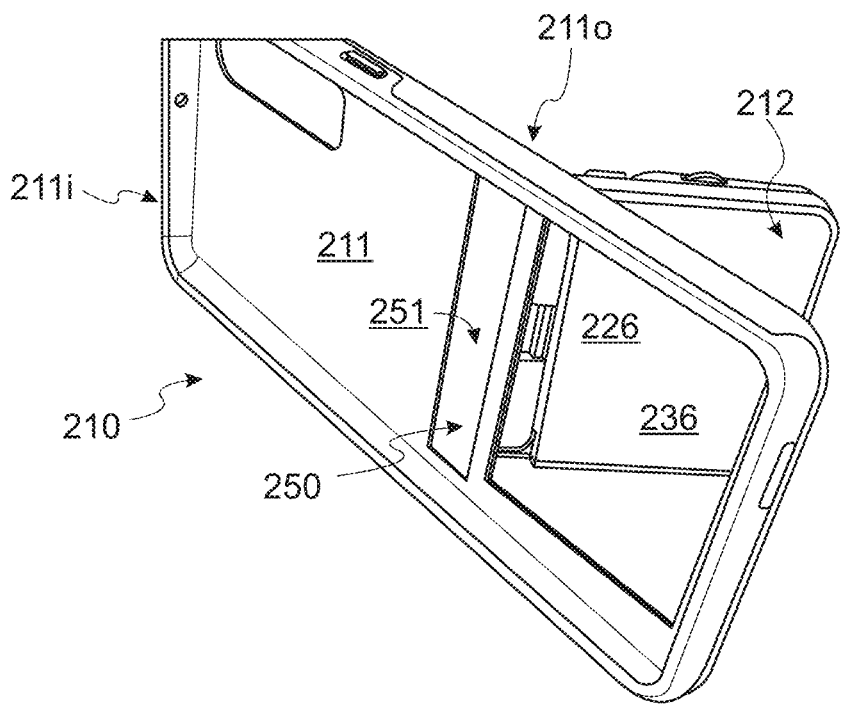
Figure 16:
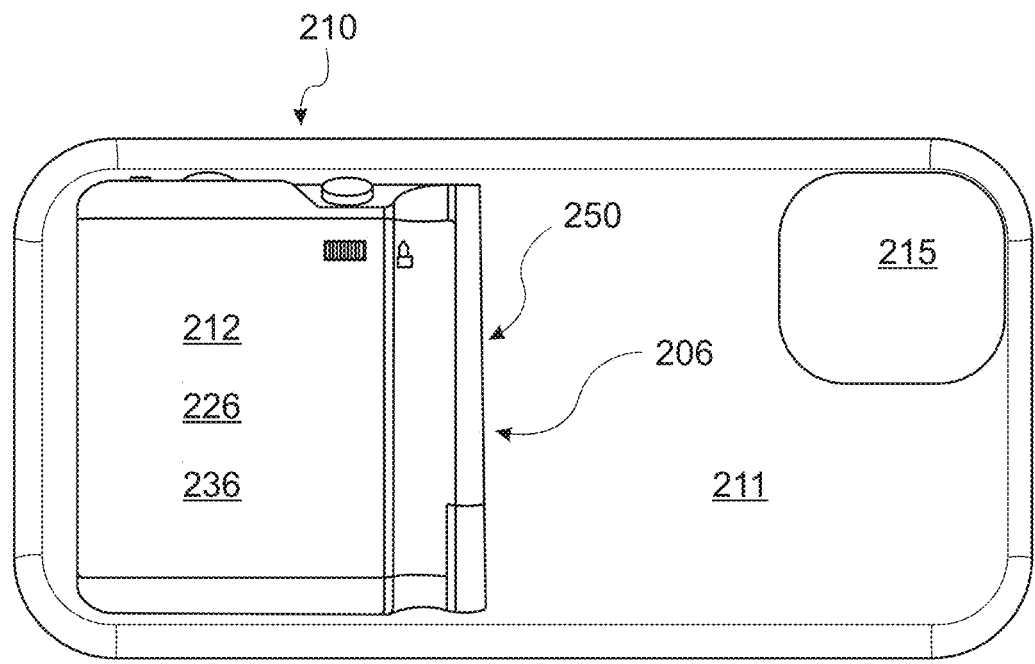
Figure 17:
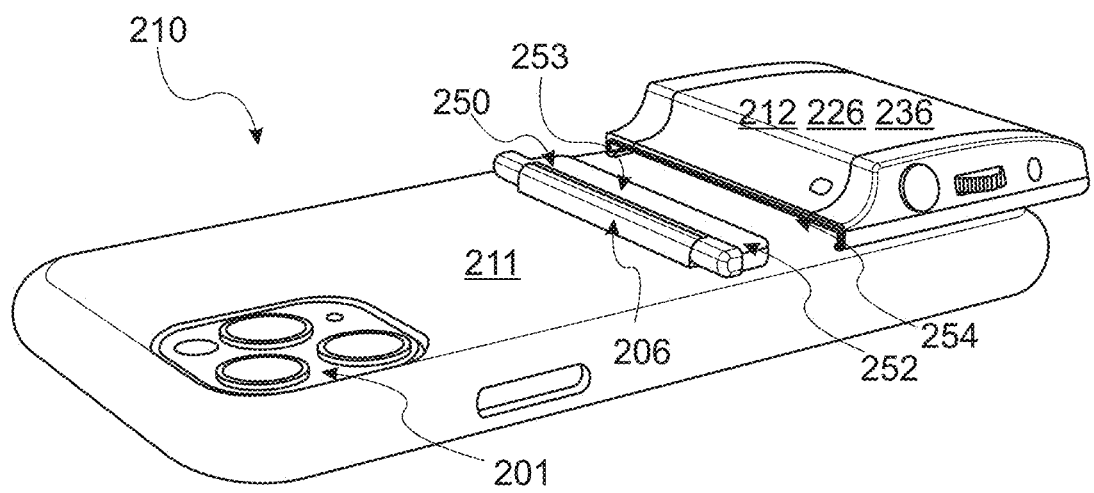
Figure 23:
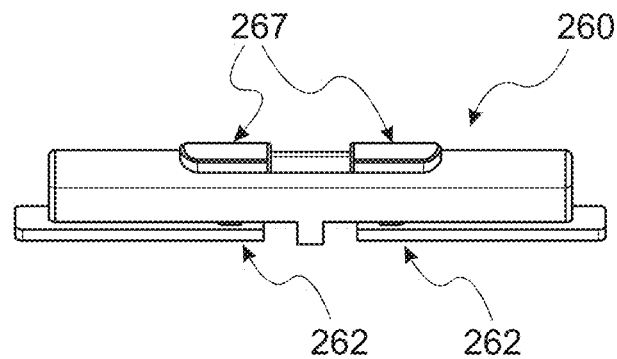
Figure 24:
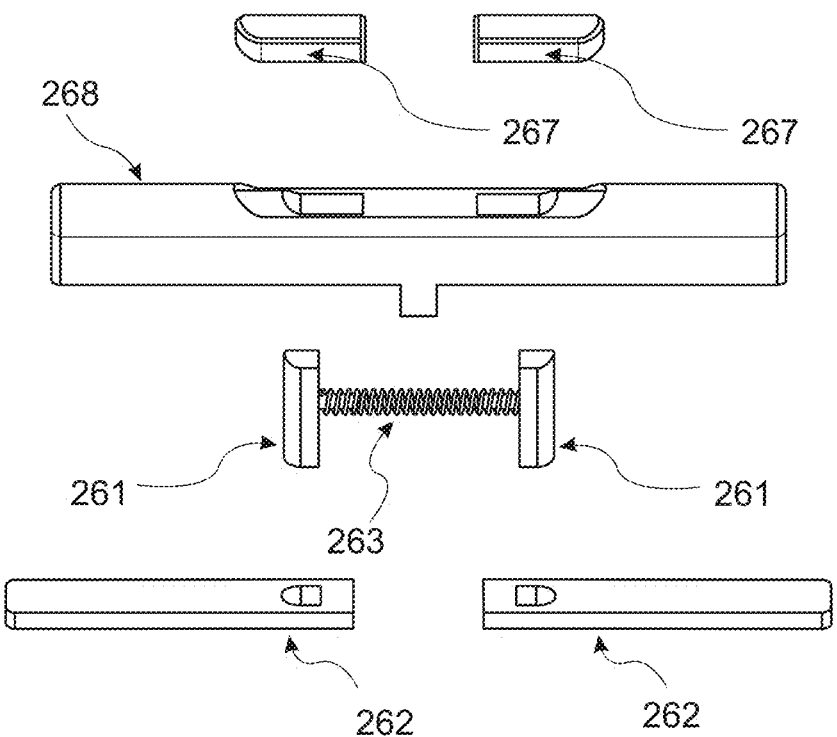
Figure 25:
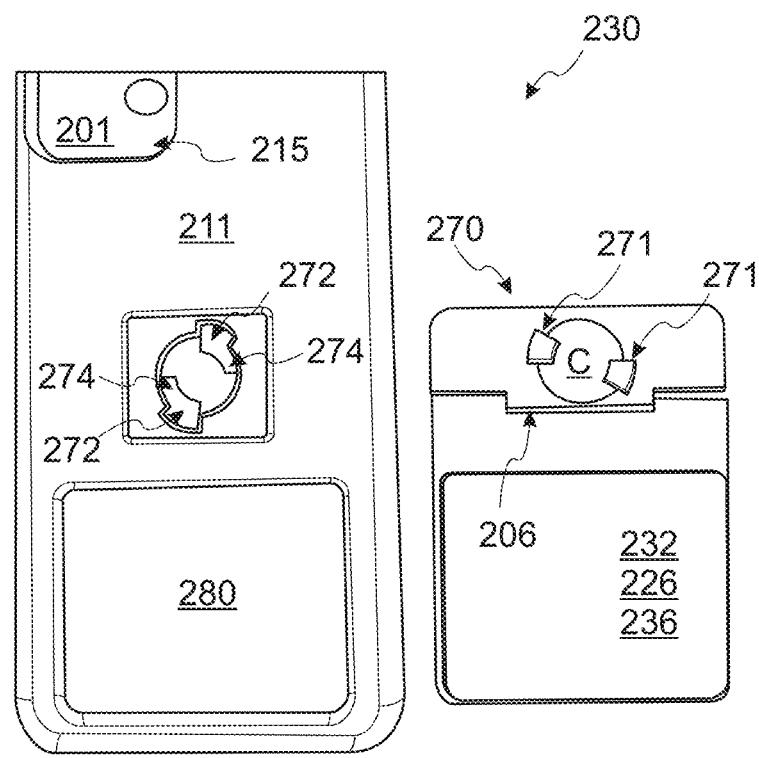
Figure 26:
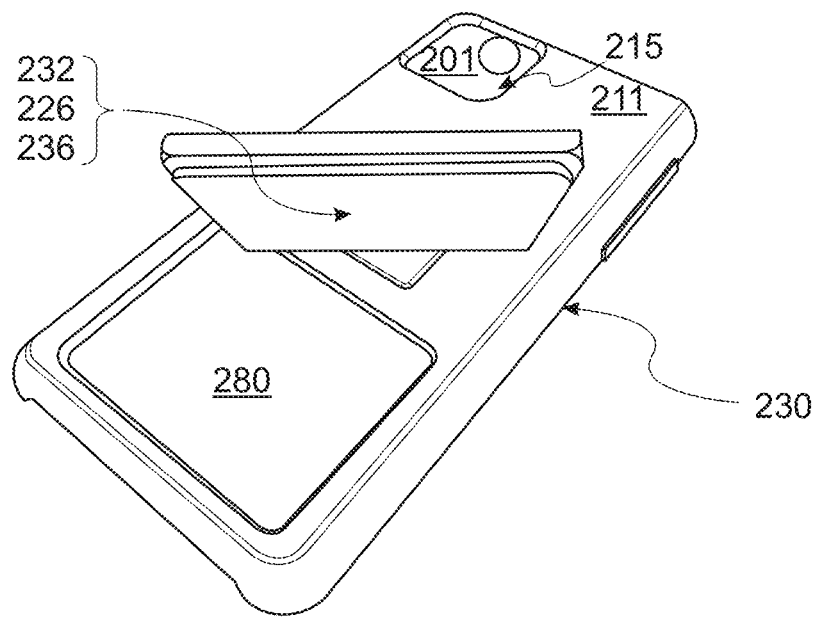
Figure 27:
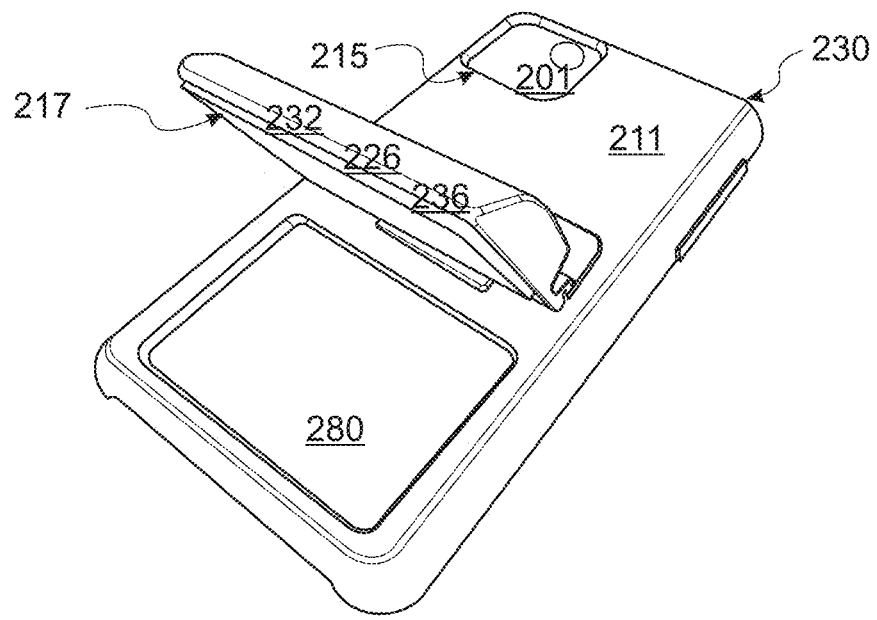
Figure 28:
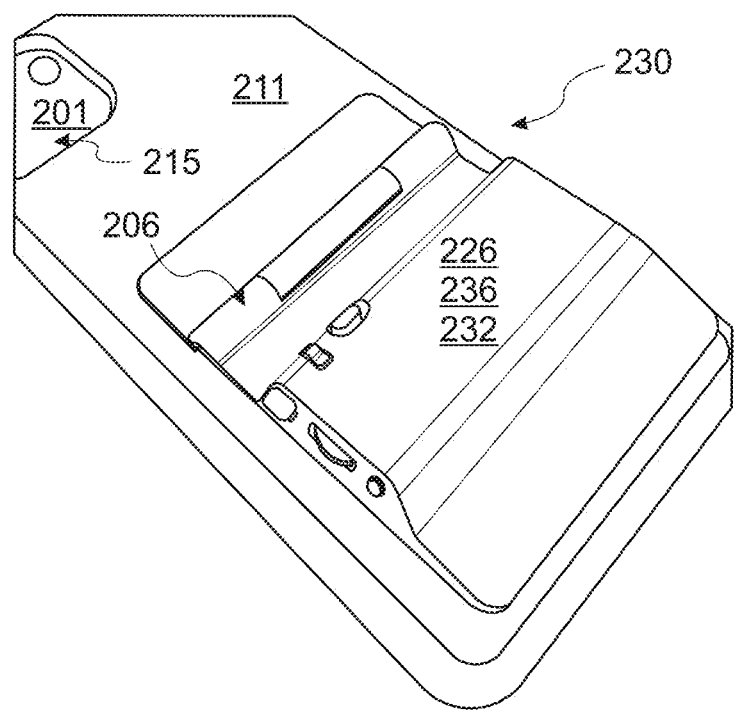
Figure 29:
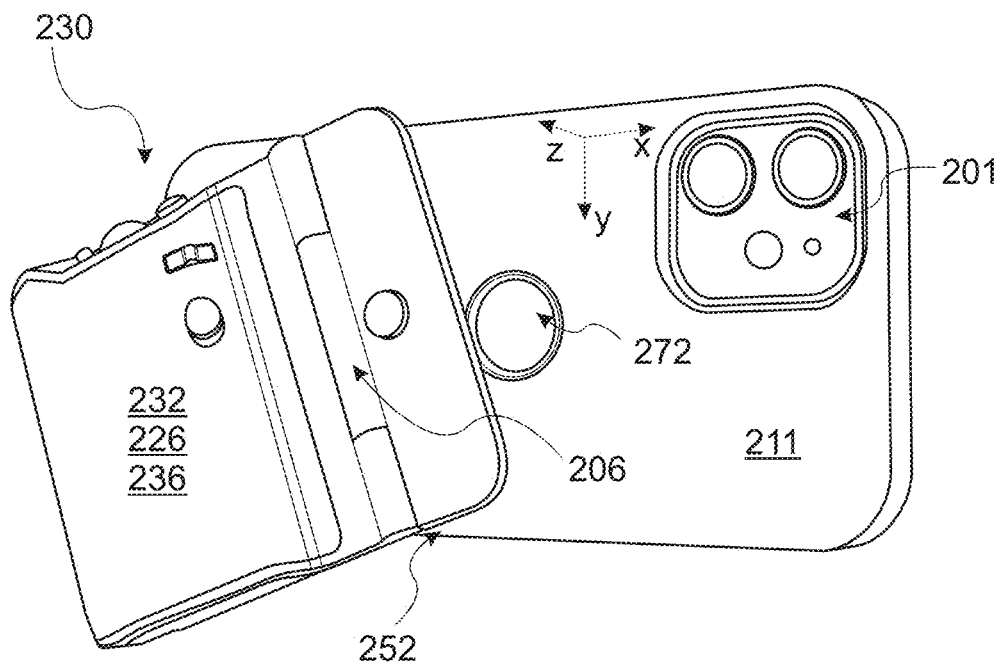
Figure 30:
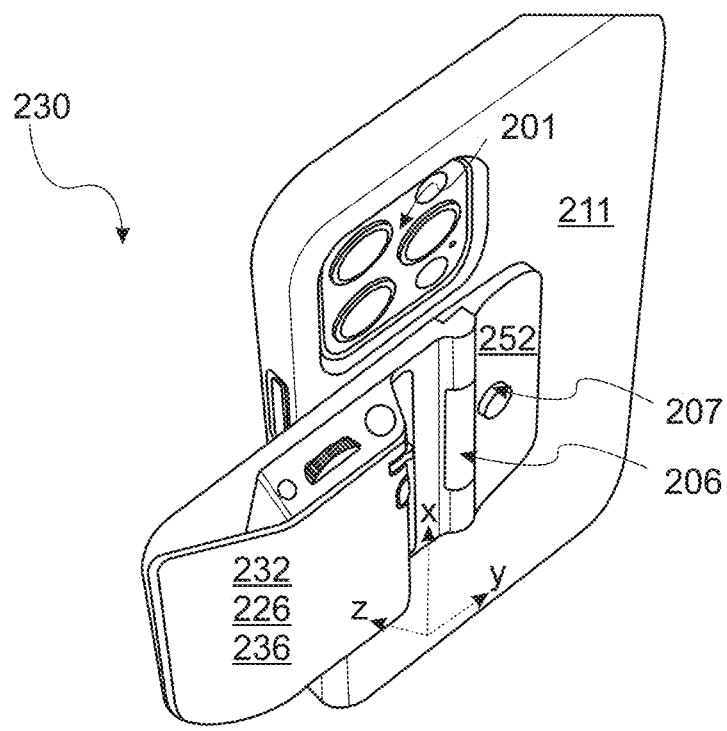
Figure 33A:
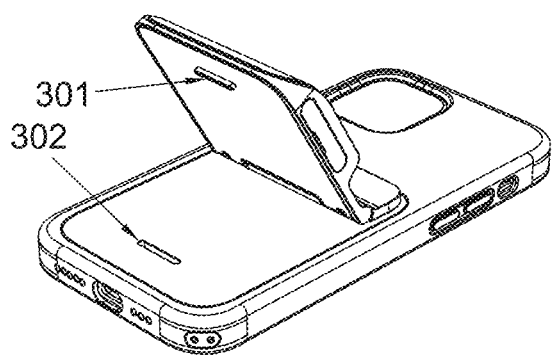
Figure 33B:
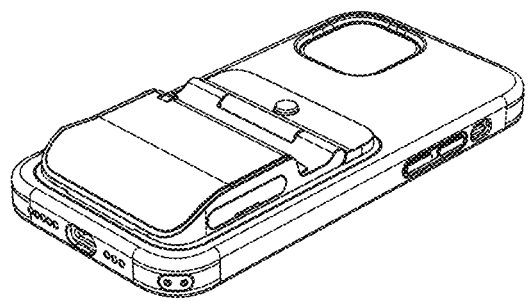
Figure 34A:
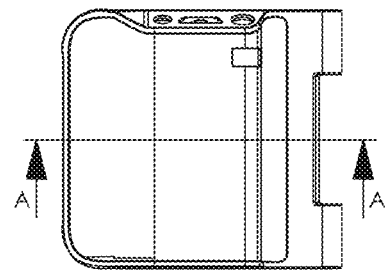
Figure 34B:
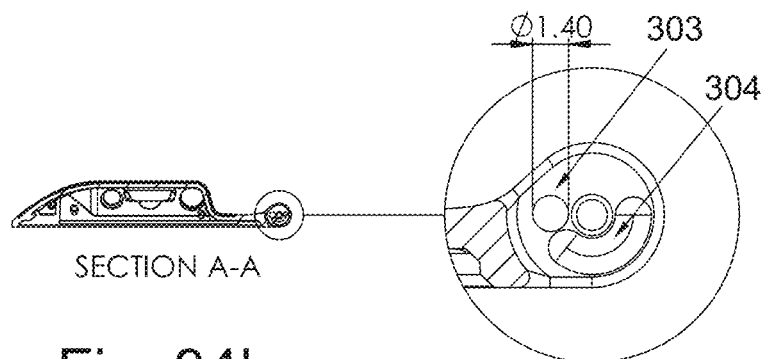
Figure 34C:
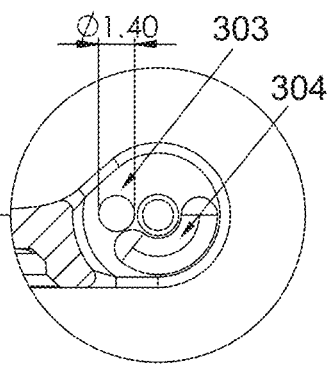
Figures 35A, 35B:
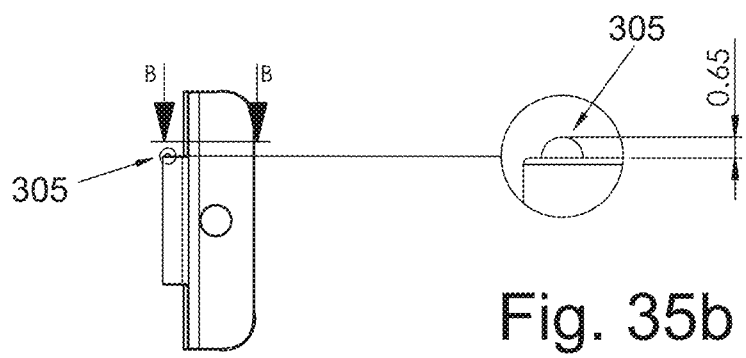
Figures 35C, 35D:
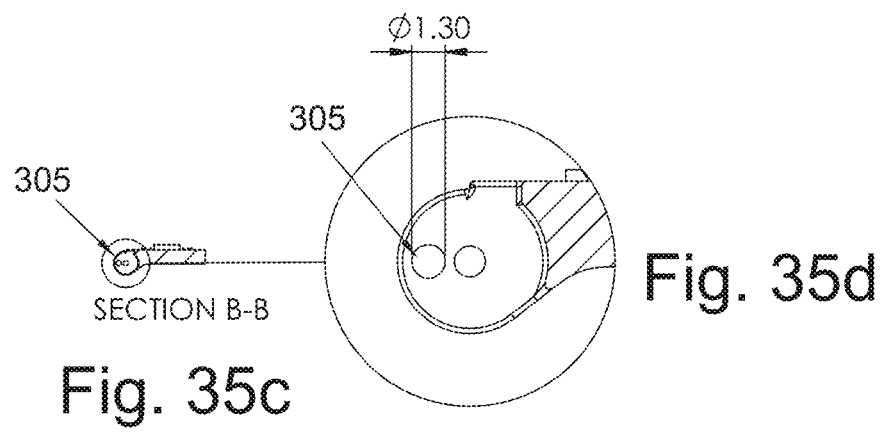

FIG. 5 schematically shows a mechanism for deploying the reconfigurable control panel of FIG. 4: ($b_1$) in the stowed-away state; and, ($b_2$) in the deployed state (shown with and without the reconfigurable grip);

FIG. 6 is a schematic perspective view of an alternative camera control module with a reconfigurable grip and a reconfigurable control panel, shown in: ($b_3$) a partially reconfigured state that provides a camera grip in the form of a finger loop; and, ($b_2$) in a fully reconfigured state providing a camera grip;

FIG. 7 schematically shows an alternative reconfigurable grip and an alternative reconfigurable camera control panel;

FIG. 8 is a schematic perspective view of another two-part accessory for a camera smartphone comprising: (a) a smartphone case with integral camera grip; and, (b) a slide-in camera control module; shown in (i) a disassembled state; (ii) an assembled state; (iii) a first reconfigured state, providing a first camera grip; and, (iv) a second reconfigured state, providing a second camera grip in the form of a finger loop;

FIG. 9 is a schematic perspective view of another two-part accessory for a camera smartphone comprising: (a) a smartphone case with integral camera control panel; and, (b) a slide-in camera control module with reconfigurable camera grip; shown in (i) a disassembled state; (ii) an assembled state; iii) a first reconfigured state, providing a first camera grip; and, (iv) a second reconfigured state, providing a second camera grip in the form of a finger loop;

FIG. 10 is a schematic perspective view of another two-part accessory for a camera smartphone comprising: (a) a smartphone case; and, b) a slide-in camera control and grip module with integral camera grip and control panel; shown in (i) a disassembled state; (ii) an assembled state; iii) a first reconfigured state, providing a first camera grip; and, iv) a second reconfigured state, providing a second camera grip in the form of a finger loop;

FIG. 11A is a perspective view of a further accessory with a reconfigurable grip in a deployed state, mounted on a camera smartphone;

FIG. 11B is a perspective view of the accessory of FIG. 11A with the reconfigurable grip in a stowed-away state;

FIG. 12 is a block diagram representing inputs for a controller for a camera smartphone accessory as described herein;

FIG. 13 is a flow diagram representing methods of controlling a camera incorporated into a smartphone as described herein;

FIG. 14 is an exploded view of a further accessory for smartphones, having four assemblable components;

FIG. 15 is a perspective view of the accessory of FIG. 14, wherein the four assemblable components have been assembled, but without a smartphone received in the accessory;

FIG. 16 is a top plan view of a further accessory for smartphones, similar to that of FIGS. 14 and 15, having only three assemblable components;

FIG. 17 is a perspective view of the accessory of FIG. 16 installed to a smartphone with a camera grip component shown in a disassembled status to reveal how the camera grip component can be assembled to, and disassembled from, a case component of the accessory via a connector;

FIG. 18 is a perspective view of the accessory of FIGS. 16 and 17, installed to a smartphone, with the camera grip assembled;

FIG. 19 is a perspective view of the accessory of FIGS. 16, 17 and 18 wherein the camera grip is used as a kickstand to support the smartphone in portrait configuration;

FIG. 20*a* is a detail view of a further accessory for smartphones, similar to those of FIGS. 14-19, but comprising only two assemblable components, wherein a camera grip component is shown in a latched configuration, latched to a case component of the accessory; FIG. 20*b* is a cross-sectional representation through a latch of the accessory of FIG. 19;

FIG. 21a is a detail view of the accessory of FIGS. 20a and 20b, with the camera grip component in an unlatched configuration; FIG. 21b is a cross-sectional representation through the latch of the accessory of FIG. 21a;

FIG. 22a is a detail view of the accessory of FIGS. 20-21 with the camera grip component in a released or disassembled configuration; FIG. 22b is a cross-sectional representation through the latch of the accessory of FIG. 22a;

FIG. 23 is a front perspective view of the release mechanism of the camera grip component of the accessory of FIGS. 20-22;

FIG. 24 is an exploded view of the release mechanism of FIG. 23;

FIG. 25 is a top plan view of a further accessory for smartphones, which is a variation of the accessory of FIGS. 20-22, also having two and only two assemblable components, shown in a disassembled status;

FIG. 26 is a perspective view of the accessory of FIG. 25, with a camera grip component being assembled to a case component of the accessory;

FIG. 27 is a perspective view of the accessory of FIGS. 25 and 26, with the camera grip component assembled to the case component of the accessory, in a deployed configuration;

FIG. 28 is a perspective view of the accessory of FIGS. 25, 26 and 27, with the camera grip component assembled to the case component of the accessory, in a stowed-away or retracted configuration;

FIG. 29 is a perspective view of yet a further accessory for smartphones, similar to that of FIGS. 25-28, but having a magnetic connector, in a disassembled configuration;

FIG. 30 is a perspective view of the accessory of FIG. 29, in an assembled configuration, with a reconfigurable and reorientable camera grip component configured for taking photos in portrait mode;

FIG. 31 relates to yet a further accessory for smartphones, similar to that of FIGS. 11A and 11B, which is shown in various configurations (FIGS. 31a-31i);

FIG. 32 relates to yet a further accessory for smartphones, similar to those of FIGS. 11A, 11B and 31a-31i, which is also shown in various configurations (FIGS. 32a-32f);

FIG. 33a is a perspective view of yet a further accessory for smartphones, similar to that of FIGS. 25-29, with the camera grip in an extended configuration to reveal certain camera-grip stabilisation features; and, FIG. 33b is a perspective view of the accessory of FIG. 33a, with the camera-grip stabilisation features in an engaged configuration;

FIG. 34a is an elevation of a camera grip portion of the accessory of FIGS. 33a and 33b;

FIG. 34b is a cross section through line AA of FIG. 34a; and, FIG. 34c is a magnified view of a portion of FIG. 34b, revealing a further camera-grip stabilisation feature; and, FIG. 35a is an elevation of a connector portion of the accessory of FIGS. 33a and 33b;

FIG. 35b is a magnified view of a portion of FIG. 35a; FIG. 35c is a cross section through line BB of FIG. 35a; and FIG. 35d is a magnified view of a portion of FIG. 35c, revealing yet a further camera-grip stabilisation feature that cooperates with the camera-grip stabilisation feature of FIG. 34c.

Throughout the description and the drawings, like reference numerals refer to like features.

DETAILED DESCRIPTION

Figure 1:
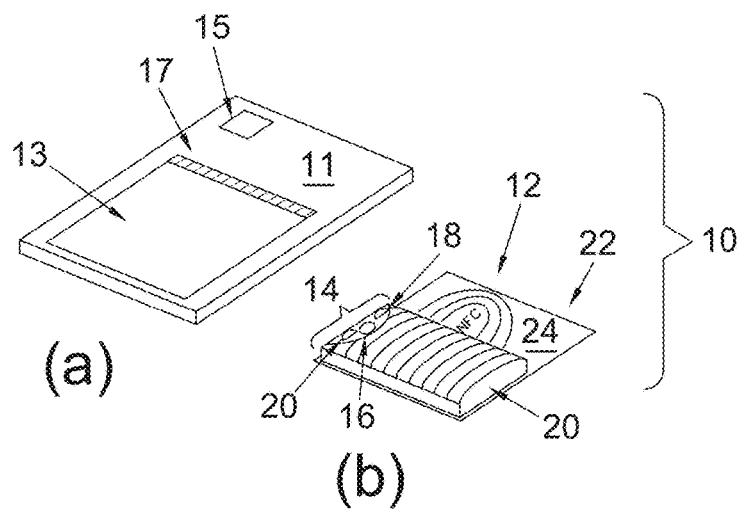
FIG. 1 is a schematic perspective view of a two-part accessory for a camera smartphone comprising: (a) a smartphone case; and, (b) a camera control module.

FIG. 1 shows a two-part accessory 10 for a smartphone that incorporates a camera (hereinafter, a camera smartphone). While this and other accessories described herein are for camera smartphones, it will be appreciated that similar accessories can be provided for any portable electronic devices that incorporate a camera.

The accessory 10 includes a first part in the form of a case 11 for the camera smartphone, and a second part in the form of a camera control module 12. The camera control module 12 comprises a controller 100 (similar to that described in connection with FIG. 12) configured to control the camera of the smartphone, for example for taking photos or changing camera settings.

Henceforth, the term "accessory" will mostly be used to describe a two-part accessory with a camera control module attachable to a case, the case being one of the two parts forming the accessory. The term "accessory" is however also used to describe a "single-part" accessory, with an integrated (or integral) case. The term "accessory" may further be used, in a broader sense, to refer just to the camera control modules described herein.

The camera control module 12 can be removably attached to the case 11. In this accessory 10, a window 13 is provided on the case 11 for receiving the camera control module 12. However, other features providing this function may be provided such as, but not limited to, a slot or a recess. It would alternatively be possible to attach the camera control module 12 to the case 11, or directly to the smartphone, via, for example, an adhesive or an adhesive element. This attachment may be permanent. However, providing a removable attachment allows the camera control module 12 to be used with different cases 11, suitable for different makes and/or models of camera smartphones. As known in the arts, a further window 15 is provided on the case 11 for exposing a set of lenses (shown in FIG. 11) of the camera.

Turning now to the camera control module 12, in use, a user actuates one or more camera controls 14 provided on the camera control module 12 to control the camera, for example for taking photos or for shooting a video. The camera controls 14 may provide camera control functions similar to those normally found in conventional cameras or could provide additional functions. In this camera control module 12, the camera controls 14 include a shutter button 16, a zoom rocker lever 18 and a camera settings button 20. However, more or fewer camera controls can be provided. Some alternative camera control arrangements will be described in more detail below.

The accessory 10 communicates wirelessly with the camera smartphone. In particular, the camera control module 12 communicates wirelessly with the camera smartphone via the controller 100, using Bluetooth®. However, alternative communication methods are possible. A wireless module may be implemented on a separate chip, but in this accessory the wireless connectivity is integrated in the controller (as described in connection with FIG. 12).

The accessory 10, via its camera control module 12, does not provide additional camera resources over the camera resources already present in the smartphone; it instead provides alternative or additional camera control features to the control features provided by default on the smartphone. In this way, a user may take pictures or videos using the camera smartphone with the picture or vide-taking experience more closely resembling that which would have been had using a conventional camera.

The one or more camera controls 14 are provided on a (static) camera grip portion 26 of the camera control module 12. The design of the camera grip portion 26 may be ergonomic, and thus facilitate the handling of the camera smartphone as a camera.

The camera control module 12 also includes an attachment sensor 22 which, in this camera control module 12, is provided in the form of an NFC reader 24 operably connected to the controller 100. Additional or alternative attachment sensors 22 may be provided, and some will be described in further detail below. In this accessory 10, the NFC reader 24 is configured to detect the presence of a corresponding NFC tag 17 provided on the case 11. More commonly, however, the NFC tag 17 will be provided as part of the smartphone, or the smartphone will be provided with the NFC reader, and the camera control module or case will be provided with the NFC tag. There may be two NFC tags, one on the case 11 and one on the smartphone, for redundancy, each of which can be discoverable by the NFC reader 24 provided on the accessory 10.

The NFC reader 24 may be configured to wake up the camera control module 12 from an energy-preserving state (ie, a sleep mode) when the accessory 10 is installed to the smartphone, or when the camera control module 12 is received in the window 13. When the controller is woken up, the wireless connection between the smartphone and the accessory (ie, between the smartphone and the controller) is established. As previously mentioned, this wireless connection supports camera control commands sent by the controller to the smartphone for controlling the camera, for example for taking pictures of changing various camera settings.

Figure 2:
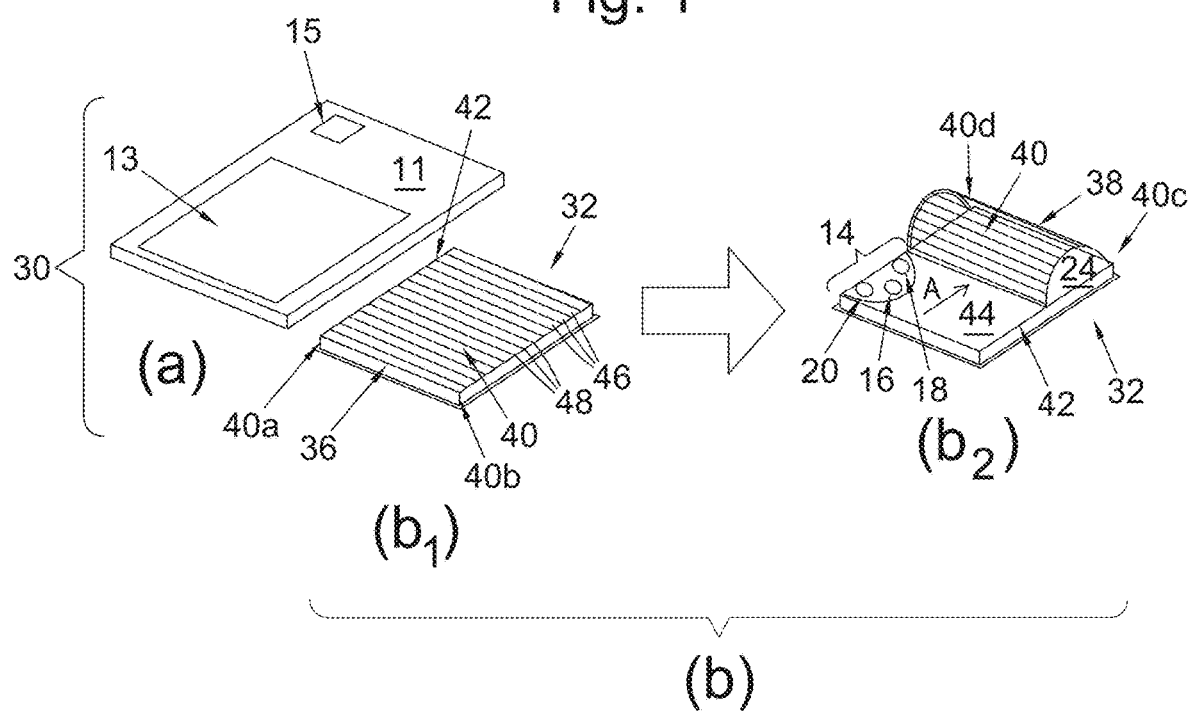
FIG. 2 is a schematic perspective view of another two-part accessory for a camera smartphone comprising: (a) a smartphone case; and, (b) a camera control module with a reconfigurable grip portion, represented ($b_1$) in a stowed-away configuration, and ($b_2$) in a deployed configuration that provides a camera grip in the form of a finger loop.

FIG. 2 shows an alternative two-part accessory 30. The case 11 is practically the same as described in relation to FIG. 1 above, with the previously described windows 13, 15 but without the NFC tag 17. An equivalent NFC tag 17 in this arrangement provided on the smartphone, although the smartphone is not shown in FIG. 2. The camera control module 32 of this accessory 30, however, differs from the camera control module 12 of FIG. 1 in that it includes at least one reconfigurable camera grip portion 36.

The reconfigurable camera grip portion 36 reconfigures from a first, stowed configuration, shown in FIG. 2($b_1$), to a second, deployed configuration, shown in FIG. 2($b_2$), to provide a camera grip 38 which, in this accessory 30, is in the form of a finger loop 87 (although, depending on the dimension of the loop, the loop could alternatively be provided as a hand loop, or a loop for multiple fingers of one hand). While this accessory 30 includes a single reconfigurable camera grip portion 36, provided by a flexible, concertina-type, element 40, it is possible to provide two or more reconfigurable portions that collectively reconfigure to provide the camera grip 38. An example will be described below in connection with FIG. 11, wherein three panes are provided to reconfigure into a camera grip.

The flexible, concertina-type, element 40 defines in the first, stowed configuration a generally flat rectangular shape. In the second, deployed configuration the flexible, concertina-type, element 40 defines a generally semi-cylindrical protrusion that constitutes the camera grip 38. The camera grip 38 greatly facilitates handling of the camera smartphone as a camera.

The flexible, concertina-type, element 40 in this accessory is made of a resiliently deformable sheeted material that defines a series of strips 46 separated by respective live hinges 48 (ie, hinges which perform their function without the presence of additional moveable parts; these live hinges could be for example formed as film hinges, that is by a thin and/or bendable portions of a material, or of a sheet of material, similar to fluted arrangements commonly found in cardboard. Alternatively, however, the hinges could include additional parts, such as hinge pins, and connect several individual elongated elements. Adjacent corners 40$a$, 40$b$ of the flexible element 40 are constrained to displace, in unison, upon a force being exerted by the user in direction A on the flexible element 40, along parallel guides 42 provided on a support structure 44 on which the flexible element 40 is accommodated. Opposed corners 40$c$, 40$d$ of the flexible element 40 are instead fixed on the support 44.

Usefully, reconfiguration of the flexible element 40 in the second, deployed configuration not only provides the camera grip 38, but it also reveals one or more camera controls 14 which, as described above in connection with FIG. 1, for this camera control module 32 too include a shutter button 16, a camera settings button 20 and a zoom rocker lever 18. Similar to the accessory described in connection with FIG. 1, this camera control module 32 too includes an NFC reader 24 as an attachment sensor 22. When attachment is detected by the attachment sensor 22, a wireless connection is established between the accessory 30 and the smartphone, and the controller is woken up from a sleep mode. The controller may then return to a sleep mode (for example, if the camera is not being used to take photos after a set time has lapsed). The controller may then be configured to be woken up again in connection with a new wake-up event such as reconfiguration of the flexible element 40 into the camera grip 38 or depression of one of the one or more camera controls 14.

The user, therefore, first mounts the camera control module 32 to the case 11 (with the smartphone already or subsequently also accommodated in the case 11) and can then reconfigure, by applying a gentle force, the reconfigurable camera grip portion 36 into the camera grip 38. This reveals the one or more camera controls 14. The accessory 30 is thus ready to be used to control the smartphone camera via the controller 100 provided in the camera control module 32, which controller 100 operates wirelessly to communicate camera control commands to the smartphone, according to actuation of the one or more camera controls 14 provided on the accessory 30.

Figure 3:
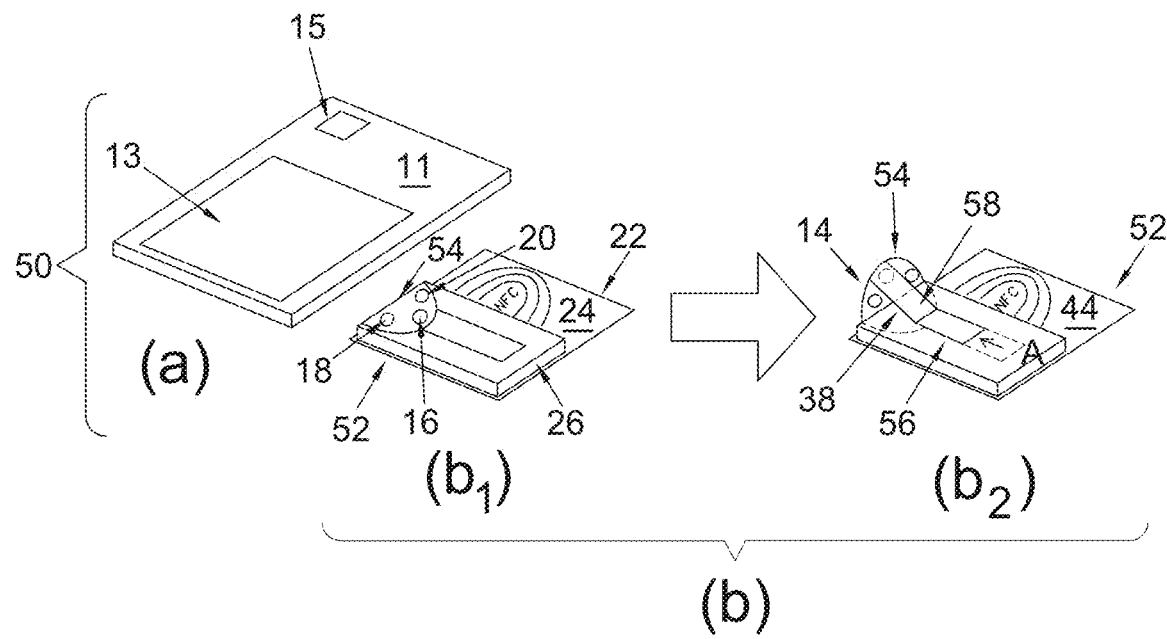
FIG. 3 is a schematic perspective view of another two-part accessory for a camera smartphone comprising: (a) a smartphone case; and, (b) a camera control module with a reconfigurable control panel, represented ($b_1$) in a stowed-away configuration, and ($b_2$) in a deployed configuration.

FIG. 3 shows an alternative two-part accessory 50. The case 11 is the same as described in relation to FIGS. 1 and 2 above, with windows 13, 15 but without NFC tag 17 (which is, instead, part of the smartphone). The camera control module 52 of this accessory 30, however, differs from the camera control modules 12, 32 of FIGS. 1 and 2 in that it includes a reconfigurable portion in the form of a reconfigurable control panel 54. The one or more camera controls 14, namely the shutter button 16, zoom rocker lever 18 and camera settings button 20, are provided in this camera control module 52, on the reconfigurable panel 54.

The reconfigurable panel 54 reconfigures between a first, stowed configuration shown in FIG. 3($b_1$) and a second, deployed configuration shown in FIG. 3($b_2$). In the first, stowed configuration of the reconfigurable control panel 54, the one or more camera controls 14 may not be active. In the second, deployed configuration of the camera control panel 54, the one or more camera controls 14 may become active, that is, they may only then be operable by the user to generate camera commands via the controller 100 for execution by the smartphone. In other words, the camera control module 52 is woken up by reconfiguration of the control panel 54. When the camera control module 52 is woken up, wireless communication is established between the camera control module 52 and the smartphone, ie between the controller 100 and the smartphone.

The slider 56 is pivotally connected to a pivoted tab 58 at one end, and the pivoted tab is pivotally connected to an end of the reconfigurable control panel 54 at the other end. In this accessory 50, the reconfigurable control panel 54 is pivotally connected at its other end to the support structure 44 of the cameral control module 52. Accordingly, the user acts with a gentle force in direction A on a free end of the slider 56, as shown in FIG. 3($b_2$). Displacement of the slider 56 in direction A results into rotation of the pivoted tab 58 of about 45 degrees in the clockwise direction, with an upwards lift of the pivotal connection between the pivoted tab 58 and the reconfigurable control panel 54. As a result, the control panel 54 reconfigures from the in-plane position shown in FIG. 3($b_1$) to the out-of-plane position shown in FIG. 3($b_2$), with a total rotation of about 90 degree anticlockwise.

With this accessory 50, therefore, the user may be required to reconfigure the control panel 54 to the deployed position before the user is able to control the camera using the accessory 50. Alternatively, control of the camera with the accessory may be permanently available, without needing to reconfigure the control panel 54. This camera control module 52 provides a first camera grip 26 when the control panel is in the first, stowed position—this grip being effectively similar or, from a handling perspective, no better than the static camera grip discussed above in connection with the accessory 10 shown in FIG. 1; and, a second camera grip 38 when the control panel is in the second, deployed position—this being in principle similar to the reconfigurable camera grip discussed above in connection with the accessory 30 shown in FIG. 2, and improving significantly the handling of the smartphone as a camera.

FIG. 4 illustrates how the provision of a reconfigurable portion 36 in the form of a flexible, concertina-type, element 40 as discussed in connection with FIG. 2, may be combinable with the provision of a reconfigurable control panel 54 as discussed in connection with FIG. 3.

In the accessory 70 shown in FIG. 4, the camera control module 72 includes a support or support structure 44 that fixes the position of adjacent corners 40c, 40d of flexible element 40; opposed corners 40a, 40b are instead free to translate in direction A, parallel to the parallel guides 42 of supports structure 44, as described in connection with FIG. 2. Displacement of the flexible, concertina-type, element 40 in direction A to form the camera grip 38 instigates rotation of the reconfigurable control panel 54, as shown in FIG. 4($b_2$). Similar to the principle illustrated for accessory 50 of FIG. 3, the flexible element 40 and control panel 54 cooperate in the respective reconfigured states to provide the camera grip 38. FIG. 5 shows this mechanism in more detail.

In FIG. 5, the reconfigurable control panel 54 includes only two camera controls, that is, a combined shutter-and-zoom button 19 and a camera settings button 20. As discussed earlier, however, any number and arrangement of camera controls may in principle be included in any of the accessories described herein, as desired, or as required, and any or all of these camera controls can be provided on a reconfigurable control panel 54 like the reconfigurable control panel 54 of FIGS. 3 and 4, previously discussed, or as presented herein in connection with FIG. 5.

In the stowed configuration, the control panel 54 is hidden behind the flexible, concertina-type, element 40, as shown in FIG. 5($b_1$). The flexible element 40 is of similar construction to that described in connection with FIG. 2, with strips 46 of resiliently deformable material defined between film hinges 48. In the deployed configuration, the control panel 54 is revealed, and the on-board camera controls 19, 20 can thus be operated by the user.

A slider 56 is arranged to move horizontally from right to left, as seen in FIG. 5($b_1$), under a gentle force exerted by the user. Movement of the slider 56 horizontally from left to right causes, simultaneously, the flexible element 40 to reconfigure as the camera grip 38, and the control panel 54 to rotate upwardly by about 90 degrees, as shown in FIG. 5($b_2$). The slider is connected by a linkage (not shown) to the flexible element 40, so that movement of the slider 56 can otherwise be instigated by action on the flexible element 40 in direction A, as shown in FIG. 4. The slider 56 is pivotally connected to link 57, which in turn is pivotally connected to pivoted tab 58, which in turn is pivotally connected to an end of the reconfigurable control panel 54. Accordingly, the slider 56 causes the link 57 to reconfigure from the angled position shown in FIG. 5($b_1$) to the vertical position shown in FIG. 5($b_2$). Upwards movement of the link 57 pushes upwardly the lower end of the pivoted tab 58. The pivoted tab 58 accordingly pivots out-of-plane, counter-clockwise, of about 90 degrees, and reconfigures as shown in FIG. 5($b_2$).

With the mechanism of FIG. 5, therefore, the user may choose whether to act on the reconfigurable flexible element 40, as described in connection with FIG. 4, or on the slider 56, as described in connection with FIG. 5, to reconfigure the accessory 70 with the camera grip 38. The camera grip 38 is the result of the reconfiguration both of the flexible element 40 and the control panel 54; in other words, in the mechanisms of FIG. 5, there are two reconfigurable portions 40, 54 that cooperate to collectively to form the camera grip 38. In order to return the mechanism in the stowed position shown in FIG. 5($b_1$), the user either acts, in opposite direction, on the slider 56, on the flexible element 40 and/or on the reconfigurable control panel 54.

FIG. 6 shows a variation 72 of the camera control module described in connection with FIG. 4. In this variation 72, the flexible, concertina-type, element 40 can be reconfigured to provide camera grips at different positions along the length of the module 72. Further, some but not all the camera grips are in the form of a finger loop 87. On the contrary, with camera control module 32 of FIG. 2, the camera grip 38 could only be formed, in the shape of a finger loop 87, on or near the right-hand side of the module (due to the corners 40c, 40d being fixed on the support structure 44). Likewise, with camera control module 72 of FIG. 4, a camera grip 38 (resembling that of traditional cameras) could only be formed on or near the left-hand side of the module (due, again, to the corners 40c, 40d being fixed on the support structure 44).

As shown in FIG. 6, in the present variation of camera control module 72, each of the opposed pairs of adjacent corners 40a, 40b and 40c, 40d can move in unison along the parallel guides 42 provided on the support structure 44. Accordingly, semi-cylindrical camera grip protrusions 38 can be formed at arbitrary intermediate positions, as shown in FIG. 6($b_3$), between the two limiting positions shown, respectively, in FIG. 2($b_2$) and FIG. 4($b_2$). The camera grip 38 shown in FIG. 6($b_3$) is in the form of a finger loop, which may easily be formed by the user by exerting a force on the flexible element 40 in direction D, as shown. However, if the camera grip 38 is formed in the position shown in FIG. 6($b_2$), then the camera grip 38 may be advantageously complemented by the reconfigurable control panel 54, as previously described.

Reconfiguration of the control panel 54 is not automatically instigated in the variation 72 of camera control module shown in FIG. 6 by the displacement of corners 40a and 40b of the flexible element 40 in direction A. Instead, to deploy the control panel 54, the user must first extract the control panel 54 from a recess or slot provided in the support structure 44, as shown by arrow B (the control panel 54 slides out from its recess, if pulled out), and then rotate to control panel 54 clockwise 90 degrees, as shown by arrow C, until the control panel 54 securely engages with the reconfigured flexible element 40 via releasable latch 60. Alternatively, however, it would be possible to link the reconfiguration of the flexible element 40 with the extraction B of the control panel 54; rotation C could instead still be left with the user.

Otherwise, the camera grip 38 will be in the form of a finger loop 87, as previously described. When the camera grip 38 is provided in the form of a finger loop 87, the camera is controlled by pulling out the control panel 54 from a recess in the camera control module 72, and rotating it 180 degrees.

An important feature of reconfigurable control panel 54 of FIG. 6 is that it includes a slidable camera settings dial 55 which, just like the control panel 54, can slide in and out the recess, but does not rotate clockwise to form the camera grip together with control panel 54. Accordingly, different reconfigurable portions 40, 54, 55 of the camera control module 72 described herein may reconfigure according to different extents, or in different fashions, to provide one or more required deployed configurations. In the stowed configuration, the reconfigurable portions minimise the space occupied by the accessory 70, so that the smartphone can be easily stored away, for example in a purse or pocket, or so that the smartphone can be more easily operated in a non-camera mode, for example as a telephone.

FIG. 7 shows an alternative arrangement comprising three reconfigurable portions 36 in the form of, respectively: a flexible band 80 reconfigurable to form a camera grip 38; a reconfigurable control panel 54; and, a reconfigurable camera settings dial 55.

The flexible band 80 comprises four band components 81, 82, 83 and 84. The flexible band 80 resembles, in principle, a watch bracelet of the type with individual links. The control panel 54 is as previously described herein, with three camera controls 16, 18, 20 each of which is also as previously described herein. The reconfigurable camera settings dial 55 is also as previously described herein. The features previously described will not be further described.

The band components 81, 82, 83, 84 are each in the form of a metal link and are hinged one to another as shown in FIG. 7. In the deployed configuration of FIG. 7, the camera grip 38 is formed by the band components 81, 82, 83, 84 together with the reconfigurable control panel 54. The band components 81, 82, 83, 84 and control panel 54 are generally shaped as a loop 87. The loop 87 could be sized for receiving one or more fingers of a user, or a whole hand.

The reconfigurable control panel 54 is extracted from a recess in the control module (not shown in FIG. 7), then is rotated as described previously and removably secured to an end of band component 81 via the latch 60. If the control panel 54 cannot rotate more than 90 degrees (because it is intrinsically so constrained, for example by its own hinge construction), the position of the control panel 54 shown in FIG. 7 determines the shape of the loop 87. However, in other arrangements, the shape of the loop 87 could be determined by other factors such as any constraints in relative rotation between the links 81, 82, 84, 84, and the length of the links.

In order to reconfigure the reconfigurable portions 36 from the position shown in FIG. 7 to a stowed configuration (not shown), the latch 60 is undone and the control panel 54 and camera settings dial 55 are stored back in the recess on the camera control module (not shown), and the band components 81, 82, 83, 84 are repositioned in a relatively flatter configuration compared to the configuration of FIG. 7. For example, link 81 folds flat over links 82 and 83 as shown by arrows A and B.

Alternatively, the latch could be omitted, and the control panel 54 may remain permanently connected to the band component 81. Accordingly, the control panel may be allowed to rotate past 90 degrees clockwise from the position as extracted from the recess in direction E, the loop 87 may be maintained, instead of but collapsed toward a flatter position, according to direction of rotation D. Alternative configurations may be possible, for example allowing for a control panel 54 that may be permanently attached to the flexible band 80, but which could be translated or lowered according to direction E to reveal a fixed camera settings dial 55.

The reconfigurable portions 36 are, in this arrangement, collectively orientable relative to the case 11, which is shown in FIG. 7 only schematically. To orient the reconfigurable portions relative to the case, link 84 is rotated relative to a pin 85 according to rotation C. The reconfigurable portions 36 are also collectively translatable relative to the case 11. To translate the reconfigurable portions relative to the case 11, the pin 85 is moveable along a slot 86 which may be provided, for example, on the case 11.

FIGS. 8, 9 and 10 illustrate further two-part accessories.

Starting from FIG. 8, a two-part accessory 90 is illustrated in FIG. 8(*i*) in a disassembled state. This two-part accessory 90 includes a case 91 for a camera smartphone and a slot-in camera control module 92 that can be received in a recess 93 for the camera control module 92 provided on the case 91. The two-part accessory 90 is shown in an assembled state in FIG. 8(*ii*).

The case 91 has a number of features similar to those described previously in connection with the cases 11, and these features will thus not be described again. However, the present case 91 is different in that it incorporates a reconfigurable portion 36 that reconfigures into a camera grip 38, similar to the reconfigurable portion and camera grip previously described in connection with FIG. 6, and in that it also incorporates a controller 100. The reconfigurable portion 36 is in the form of a flexible, concertina-type, element 40 which is also equivalent to that previously described in connection with FIG. 6. Accordingly, the details of the flexible element 40 will not be described again. Instead, the description of this accessory 90 will be focused around the camera control module 92 and the way it communicates with the controller 100, which is integrated into the case 91.

The camera control module 92 does not include the controller 100, or a portion of the controller 100, but it only includes one or more camera controls 14, which, in the case of the present camera control module 92 are provided in the form of a two-step focus-and-shutter button 16 and zoom rocker lever 18. The controller 100 is analogous to the controllers 100 previously discussed and an example will be described below with reference to FIG. 12. Operable connection (by means of an appropriate circuit portion, not shown) between the one or more camera controls 14 and the controller is established in this accessory 90 only upon insertion of the slot-in camera control module 92 in the recess 93, as this completes a circuit (not shown) that allows communication therebetween.

Alternatively, the camera controls 14 could be arranged to communicate wirelessly with the controller 100, but wireless communication could otherwise be used only between the accessory and the camera smartphone. The controller 100 may be woken up, and therefore control of the camera via the accessory 90 initiated, by insertion of the camera control module 92 into the recess 93. Additional or alternative wake-up events could otherwise be implemented, such as reconfiguration of the flexible element 40 to provide a camera grip 38, or depression of at least one of the one or more camera controls 14.

FIG. 8(*iii*) shows the flexible, concertina-type, element 40 reconfigured to provide a first camera grip 38 located to the left of the case 91. In order to reconfigure the flexible element 40 in this position, the user exerts a horizontal force on a nominal plane defined by the case 91 from right to left, pushing gently on a vertical side 40*ab* of the flexible element 40. FIG. 8(*iv*) shows the flexible, concertina-type element 40 reconfigured to provide a second camera grip 38 (this one in the form of a finger loop) located mid-way along a set of guides 42 provided on the case 91, similar to the guides previously described. In order to reconfigure the flexible element 40 in this position, the user exerts a horizontal force on a nominal plane defined by the case 91 from left to right, pushing gently against an opposed vertical side 40*cd* of the flexible element 40.

These configurations reveal the presence of reconfiguration sensors 95, 96 located at either end of a support structure 44 provided on the case 91 to support the flexible element 40 and thus the reconfigurable grip 38, which is similar to the support structure 44 previously described. In the described accessory 90, each reconfiguration sensor 95, 96 is a position sensor operably connected to the controller 100 and capable of transmitting to the controller 100 information related to the position of a respective side 40*ab*, 40*ac* of the flexible element 40 along the parallel guides 42.

Alternative reconfiguration sensing principles could be used. For example, the reconfiguration sensor may comprise or be arranged to sense one or more magnets, or one or more switches, arranged to sense the reconfiguration of the flexible element 40. Redundancy could be provided by the use of more sensors, potentially of different type, all operably connected to the controller 100. A possibility would be to use NFC reader and tag pairs similar to the NFC reader 24 and NFC tag 17 pairs previously discussed in connection with the attachment sensor 22 of FIGS. 1-4. In this arrangement, however, both the NFC reader and tag would need to be located on the case 91 (for example one as part of the case 91 and the other as part of the reconfigurable portion 36 of the case 91) rather than one on the accessory and one on the case or underlying camera smartphone.

In FIG. 9, a two-part accessory 90 similar to that of FIG. 8 is illustrated. In FIG. 9(*i*) the accessory is shown in a disassembled state. The two-part accessory includes a case 91 for a camera smartphone and a slot-in camera grip module 94 that can be received in a recess 93 for the camera grip module 94 provided on the case 91. The two-part accessory 90 is shown in an assembled state in FIG. 9(*ii*).

The case 91 has a number of features similar to those described previously in connection with the cases 11, and these features will thus not be described again. However, the present case 91 is different in that it incorporates one or more camera controls 14 for controlling the camera of the smartphone, and a controller 100. The one or more camera controls 14 are provided in the form of a two-step focus-and-shutter button 16 and zoom rocker lever 18.

The camera grip module 94 includes a reconfigurable portion 36 that reconfigures into a camera grip 38, similar to the reconfigurable portion and camera grip previously described in connection with FIG. 6. The reconfigurable portion 36 is in the form of a flexible, concertina-type, element 40 which is also equivalent to that previously described in connection with FIG. 6. Accordingly, the details of the flexible element 40 will not be described again. The present description will be focused around the camera grip module 94 and the way it communicates with the controller 100, which is integrated into the case 91.

The camera grip module 94 does not include the controller 100, or a portion of the controller 100, but only includes the reconfigurable grip portion 36, and related sensors 95, 96. The controller 100 is analogous to the controllers 100 previously discussed and will be further described below with reference to FIG. 12. Operable connection between the one or more camera controls 14 and the controller 100 is permanent whilst operable connection between the camera grip module 94 and the controller is only established in this accessory 90 upon insertion of the slot-in camera grip module 94 in the recess 93, as this completes a circuit (not shown) that allows communication therebetween. Alternatively, the camera controls 14 and/or the camera grip module 94 could communicate wirelessly with the controller 100.

FIG. 9(*iii*) shows the flexible, concertina-type, element 40 reconfigured to provide a first camera grip 38 located near the left of the case 91. In order to reconfigure the flexible element 40 in this position, the user exerts a horizontal force on a nominal plane defined by the case 91 from right to left, pushing gently on a vertical side 40*ab* of the flexible element 40. FIG. 9(*iv*) shows the flexible, concertina-type element 40 reconfigured to provide a second camera grip 38 (in the form of a finger loop) located mid-way along a set of guides 42 provided on the camera grip module 94, similar to the guides previously described. In order to reconfigure the flexible element 40 in this position, the user exerts a horizontal force on a nominal plane defined by the case 91 from left to right, pushing gently against an opposed vertical side 40*cd* of the flexible element 40.

These configurations reveal the presence of reconfiguration sensors 95, 96 located at either end of a support structure 44 provided as part of the camera grip module 94 to support the flexible element 40 and thus the reconfigurable grip 38, which is similar to the support structure 44 previously described. In the described accessory 90, each reconfiguration sensor 95, 96 is a position sensor operably connected or connectable to the controller 100 and capable of transmitting to the controller 100 information related to the position of a respective side 40*ab*, 40*ac* of the flexible element 40 along the parallel guides 42. Alternative reconfiguration sensing principles could be used, as previously described.

In FIG. 10, a two-part accessory 99 similar to that of FIGS. 8 and 9 is illustrated. In FIG. 10(*i*) the accessory is shown in a disassembled state. The two-part accessory 99 includes a case 98 for a camera smartphone and a slot-in camera control and grip module 97 that can be received in a recess 93 for the camera control and grip module 97 provided on the case 98. The two-part accessory 99 is shown in an assembled state in FIG. 10(*ii*). The camera control and grip mode 97 comprises an NFC reader 24 similar to that described in connection with FIGS. 1-4. An associated NFC tag 17 is provided as part of the case 98. The NFC reader and tag pair 24, 17 form an attachment sensor 22 that functions as described in connection with FIGS. 1-4. The NFC tag 17 could be part of the underlying smartphone. Otherwise, the NFC reader 24 could be part of the smartphone, and the NFC tag 17 could be provided as part of the camera control and grip module 97.

The case 98 has a number of features similar to those described previously in connection with the cases 91 of FIGS. 8 and 9, and these features will thus not be described again. However, the present case 98 is different in that it does not incorporate the controller 100. The controller 100, in this accessory 98, in instead provided as part of a camera grip and control module 97. The case 98 include a window 15 for the camera lenses, as described in connection with FIG. 1.

The camera grip and control module 97 in addition includes a reconfigurable portion 36 that reconfigures into a camera grip 38, similar to the reconfigurable portion of the camera grip previously described in connection with FIG. 6. The one or more camera controls 14 are provided as part of the camera control and grip module 97 in the form of a two-step focus-and-shutter button 16 and zoom rocker lever 18. The reconfigurable portion 36 is in the form of a flexible, concertina-type, element 40 which is also equivalent to that previously described in connection with FIG. 6. Accordingly, the details of the flexible element 40 will not be described again. The present description will be focused around the camera control and grip module 97 and the way it communicates with the controller 100.

The camera control and grip module 97 could alternatively only include a part of the controller 100, or a portion of the controller 100, in addition to the camera controls 16, 18 and the reconfigurable grip portion 36, and related sensors 95, 96. The controller 100 is in every other respect analogous to the controllers 100 previously discussed and an example will be further described below with reference to FIG. 12. Operable connection between the one or more camera controls 14 and the reconfigurable grip portion 36 and the controller 100 is therefore permanent in this accessory 99, and not only established upon insertion of the slot-in camera control and grip module 97 in the recess 93, as this completes a circuit (not shown) that allows communication therebetween. Alternatively, the camera controls 14 and/or the reconfigurable camera grip portion 36 provided on the camera control and grip module 97 could communicate wirelessly with the controller 100. The controller 100 may be woken up to control the camera following any events, including attachment of the control module 97 to the case 98, depression of any of the camera controls 14, and/or reconfiguration of the reconfigurable portion 36. The controller 100 may go into a sleep mode after a set time.

FIG. 10(*iii*) shows the flexible, concertina-type, element 40 reconfigured to provide a first camera grip 38 located near the left of the case 98. In order to reconfigure the flexible element 40 in this position, the user exerts a horizontal force on a nominal plane defined by the case 98 from right to left, pushing gently on a vertical side 40*ab* of the flexible element 40. FIG. 10(*iv*) shows the flexible, concertina-type element 40 reconfigured to provide a second camera grip 38 (in the form of a finger loop) located approximately mid-way along a set of guides 42 provided on the camera grip module 97, similar to the guides previously described. In order to reconfigure the flexible element 40 in this position, the user exerts a horizontal force on a nominal plane defined by the case 98 from left to right, pushing gently against an opposed vertical side 40*cd* of the flexible element 40.

These configurations reveal the presence of reconfiguration sensors 95, 96 located at either end of a support structure 44 provided as part of the camera control and grip module 97 to support the flexible element 40 and thus the reconfigurable grip 38, which is similar to the support structure 44 previously described. In the described accessory 99, each reconfiguration sensor 95, 96 is a position sensor operably connectable to the controller 100 upon insertion of the module 97 in its recess 93 and capable of transmitting to the controller 100 information related to the position of a respective side 40*ab*, 40*ac* of the flexible element 40 along the parallel guides 42. Alternative reconfiguration sensing principles could be used, as previously described.

We have described so far a number of two-part accessories for camera smartphones. It will be appreciated, however, that the accessories described herein may likewise be implemented as single-part (ie, integral or integrated) accessories, that is accessories in which no components can be assembled or disassembled.

FIG. 11 shows an example of a single-part or integrated accessory 69, wherein parts previously shown as attachable or detachable are instead integrally provided as part of the accessory 69 from manufacture. The user will not normally be able to disassemble any parts therefrom. Starting from FIG. 11A, the accessory 69 is mounted to a camera smartphone 1 including a camera. The camera is provided with a set of lenses 2 for taking photos. The lenses 2 are received in a suitable window 15 formed on a case 11 of the accessory 69, so that the case 11 provides no impediment to the taking of pictures using the camera.

In FIG. 11A, the accessory is depicted in a deployed status, wherein one or more reconfigurable portions 36 of the accessory 69 are deployed to provide a camera grip 38. In this accessory 69, the one or more reconfigurable portions 36 comprise three reconfigurable hinged panes 3, 4, 5. Each pane 3, 4, 5 has a generally rectangular shape, and is connected to at least one adjacent pane, as shown in FIG. 11A. First pane 3 includes a transversally extending edge hinged to the case 11 via a first, fixed hinge 8. This means that although said edge of the first pane 3 can rotate relative to the case 11, the first pane 3 cannot translate relative to the case 11. Second pane 4 includes a pair transversally extending edges hinged to respective transversal edges of the first and third panes 3, 5 via respective hinges 6. A transversally extending edge of the third pane 5 is hinged on one side to an edge of the second pane 4 via one of said hinges 6, and on the other side to a moveable hinge 7 which is arranged to translate along parallel guides 42 provided on the case 11 for constraining the three panes 3, 4, 5 so that they can be reconfigured into the camera grip 38, as desired.

The accessory 69 in addition includes two camera controls 14 in the form of a shutter button 16 and zoom rocker lever 18. The camera controls 14 have been described above in some detail and will thus not be described further. The accessory 69 also includes a controller 100 (not shown) of the type described in more detail below in connection with FIG. 12. The camera controls 14 are in operable communication with the controller 100, and so is a reconfiguration sensor 9 which, in this accessory 69, senses a magnet (not shown) disposed near the moveable hinge 7.

In use, the reconfigurable panes 3, 4, 5 are manually reconfigured by the user to obtain the camera grip 38. Reconfiguration of the reconfigurable portions 36 may cause the controller to generate a camera control initiation command which is then transmitted to and received by the smartphone 1. The smartphone 1 may be programmed to cause a camera mode of the smartphone 1 to be activated in response to reception of the camera control initiation command, and accordingly to hand-over, or permit, control of the camera in the camera mode to the accessory 69.

FIG. 11B shows the accessory 69 in a storage configuration. In order to reconfigure the accessory 69 in the storage configuration, the user gently pushes the first, second and third panes 3, 4, 5 longitudinally along the smartphone 1 until the panes 3, 4, 5 lie substantially flat over a nominal plane defined by the case 11.

Turning now to FIG. 12, the controller 100 described herein is in the form of a microcontroller which, as known in the arts, may be provided as an integrated printed circuit board (PCB). A variety of Bluetooth® and/or NFC ready microcontrollers can be sourced in the market at the date of filing the present application. Choice of an appropriate microcontroller 100 generally depends on design considerations, required performance and cost. It is not within the scope of the present application to describe the engineering of the accessories described herein. However, FIG. 12 introduces certain basic features of microcontrollers 100 proposed for the present accessories.

As shown in FIG. 12, the microcontroller 100 is battery powered at 3 Volts. A CR2032 battery is used, but alternative battery specifications would be possible. The microcontroller 100 includes two analogue input output (AIO) channels, which can be used for example in connection with analogue camera controls, such as, but not limited to, the camera settings dial 55 described herein. In addition, the microcontroller 100 includes two general purpose input output (GPIO) channels, which may convey input from, for example, respective camera controls 14 in the form of pushbuttons, such as the camera shutter button 16. If a combined shutter & zoom camera control button is required, then any signals coming from this type of control button may be conveyed by combining a general purpose and an analogue input/output channels, as shown in FIG. 12. The microcontroller 100 exemplified in FIG. 12 also receives input from a magnetic sensor 9, which, as explained in connection with FIG. 11, functions as a camera grip reconfiguration sensor 9.

In use, the microcontroller 100 issues camera control commands to the smartphone 1 in response to inputs received from the one or more camera controls 14. These commands are interpreted by an appropriate computer programme (for example a smartphone app) installed on the smartphone 1 and are translated accordingly into actions corresponding to the inputs received by the microcontroller 100. For example, depressing a shutter button provided on the accessory produces an input for the microcontroller which in turn issues a camera control command to the smartphone; the smartphone receives and interprets this signal by taking a photo. The microcontroller can likewise issue a camera control initiation command to activate a camera mode on the smartphone 1. Alternatively, the user may activate the camera mode on the smartphone by known means, for example by starting a camera app on the smartphone 1. The smartphone 1 may be programmed accordingly to generate and send a camera control initiation command to the accessory, handing-over the control of the camera. These processes are illustrated in more detail in connection with FIG. 13.

FIG. 13 summarises how the accessories described herein may be used to provide control of a camera incorporated into a portable electronic device such as a smartphone. With continued reference to the case of a camera smartphone 1, an accessory as described herein is initially provided 120 and mounted 130 to the camera smartphone 1. In principle, the accessory may communicate with the camera smartphone 1 independently of the accessory being actually mounted to the underlying device 1. For example, the accessory may be used in close proximity of the device 1 to control the camera. Step 130 has therefore been represented in dashed lines rather than solid lines. If the camera is not readily controlled by the accessory (this may depend on software currently running on the smartphone, then a camera control handover routine will be required, as shown in FIG. 13 by steps 160 and 170. When the handover is completed, the camera of the smartphone is controlled by the accessory. The generation of a camera control initiation command may be dependent on the user taking the step of reconfiguring the one or more reconfigurable portions 36 of the accessories described herein into a camera grip 28. Alternatively, the generation of said camera control initiation command may be dependent on the user at least partially depressing any of the camera controls 14.

Seven further accessories will now be described, with reference to FIGS. 14-32. The description of these seven further accessories will focus on features that bring forward one or more differences between these accessories and the accessories previously described.

It will be understood that one or more features which have already been described herein in connection with FIGS. 1-13, do not necessitate of further description, but may still be present in, or incorporated into, the accessories shown in FIGS. 14-32.

The accessory 210 of FIGS. 14 and 15 comprises four assemblable components: an inner case shell 211*i*, an outer case shell 211*o* (ie, collectively, inner and outer case shells 211*i*, 211*o*), a connector 250 and a camera control module 212. The camera control module 212 is constructed, shaped and arranged as a reconfigurable camera grip portion 226.

In FIG. 14, the accessory 210 is shown in a generally disassembled configuration. However, the connector 250 is shown as being assembled to the outer case shell 211*o*. More particularly, a base 251 of the connector 250 is inserted into a corresponding slot formed on the outer case shell 211*o*. To assemble the accessory 210, the connector 250 is first mounted to the outer case shell 211*o* as shown in FIG. 14, then the outer case shell 211*o* is mounted on the inner case shell 211*i*, and finally the camera grip 226 is connected to a protruding portion 252 of the connector 250. The protruding portion 252 of the connector 250 is hinged, such that the reconfigurable camera grip portion 226 also hinges on the connector 250, and it can therefore be deployed or stored away to provide a camera grip 236 for a smartphone, as described herein. In addition, the camera grip 236 can usefully be employed as a kickstand 217, as shown in FIG. 19, for supporting the smartphone in portrait configuration.

FIG. 15 shows the accessory 210 of FIG. 14 in an assembled configuration, with the camera grip 236 in an extended configuration. The reconfigurable camera grip portion 226, therefore, may be operated as a camera grip 236, which may for example provide for an improved camera grip 236 for the portable electronic device. In this accessory 210, the base 251 of the connector 250, and thus the whole connector 250, is held in the required position on the case 211*i*, 211*o* by the smartphone being accommodated within the inner case shell 211*i*. In other words, the base 251 of the connector 250, in use, is sandwiched, or wedged, between the smartphone and an inner surface of the outer case shell 211*o*.

The accessory 210 of FIGS. 16-19 differs from that of FIGS. 14 and 15 in that this accessory 210 only comprises three assemblable parts: a case 211, with an in-built connector 250, which case 211 also comprises inner and outer case shells 211*i*, 211*o*, as described above, and a camera control module 212. A window 215 is provided on the case so that a set of camera lenses of the smartphone may be used for taking pictures.

Similar to the accessory 210 described above in connection with FIGS. 14 and 15, the camera control module 212 is provided in the form of a camera grip 236. Again, the camera grip 236 is essentially a reconfigurable camera grip 236, which is reconfigurable from a corresponding reconfigurable camera grip portion 226 to provide a camera grip 226 or an improved camera grip 236 for the smartphone, as well as a kickstand 217, as shown in FIG. 19.

Also in this accessory 210 the connector 250 comprises a transversal hinge 206, that extends in a transverse or widthwise direction with respect to the case 211 or the smartphone 201. However, in this accessory 210, the connector 250 is permanently attached (for example by one or more screws, or via an adhesive—not shown) to the outer surface, that is a back face, of the case 211. This reduces the number of assemblable components to only three, which may be advantageous for the end user.

The camera control module 212 could, for example, be disassembled and used as a remote camera control. Assembling and disassembling the camera control module 212 from the accessory 210 is particularly simple, as this can be performed by engaging and disengaging the camera control module 212 via a slot 254 provided on a side of the camera control module 212, and a corresponding tongue 253 provided on the outwardly extending projection 252 of the connector 250. The tongue 253, which snaps in place into the corresponding slot 254, is hinged to the remainder of the connector 250, and thus to the case 211, via the hinge 206. The hinge 206 may take different practical implementations, all of which need not be described in detail herein.

FIGS. 20-22 are detail views of a further accessory 210 for smartphones, similar to those of FIGS. 14-19, but comprising only two assemblable components, that is a camera control module 212 and a case 211. The case 211 no longer comprises disassemblable inner and outer case shells. Therefore, the number of assemblable components 211, 212 have in this accessory 210 been reduced to a minimum. However, the case 211 is not of unitary construction, but the inner and outer portions of the case 211 cannot be assembled and disassembled by the user. Alternatively, the case 211 may be of unitary construction. As before, the camera control module 212 is shaped and constructed so as to comprise a reconfigurable camera grip portion 226, similar to the camera grip of more conventional or traditional cameras. When the camera control module 212 is assembled to the case 211, it works as a reconfigurable camera grip 236. The main difference between the accessory 210 of FIGS. 20-22 and the accessories 210 of FIGS. 14-19 is that the connector 250 is now integrated into the camera control module 212, as shown in detail in FIGS. 20a, 21a and 22a. The connector 250 still comprises a hinge 206, which his essentially as described previously (but may differ in detail). Certain constructive details of this integral or integrated connector 250 will now be described further.

FIG. 20a shows the camera control module 212 in a latched configuration. The camera control module 212 comprises a latch mechanism 260, which can be operated to latch the camera control module 212 to the case 211. The latch mechanism 260 is shown in more detail in FIGS. 23 and 24. FIG. 20b shows a cross section through the latch mechanism 260 in the configuration of FIG. 20a. The latch mechanism 260 comprises two operation arms 261. Each operation arm comprises a corresponding latching projection 262 at one end thereof. The operation arms 261 are biassed away from one another by a biasing element 263, which in this accessory 210 is simply a compression spring, as shown in FIG. 20b. The latching projections 262 extend generally parallel to the case 211, whereas the operating arms 261 of the latching mechanism 260 have a generally perpendicular extension. The latching projections 262 thus engage, in use, with a corresponding recess 264 provided on the inner side of the case 211, as best shown in FIGS. 21b and 22b.

To remove the camera control module 212 from the case 211, the user simply brings the operating arms 261 of the latching mechanism 260 as close as possible one to the other in contrast with the force exerted by the spring 263, as shown in FIG. 21b. The latching mechanism 260, and with it the camera control module 212 can therefore be extracted and then removed from the case 211, via an opening 265 formed on the outer side of the case 211. The opening 265 on the outer side of the case 211 is slightly smaller than the recess 264 on the inner side of the case 211, as best seen in FIG. 22b. This stepped configuration of the recess 264 and opening 265 allows the latching mechanism 260 to operate as described.

FIG. 23 is a front perspective view of the latching or release mechanism 260 of the camera grip component 226 of the accessory 210 of FIGS. 20-22, showing an arrangement including heads 267 of the operating arms 261 (which provide respective contact points for the user's fingertips for operating the release mechanism 260), a housing 268 within which the operating arms 261 move when they are operated by the user, and the latching projections 262. FIG. 24 is an exploded view of the same latching or release mechanism 260 of FIG. 23, showing the heads 267, the operating arms 261, the latching projections 262, the spring 263 and the housing 268 in greater constructive detail.

FIG. 25 is a top plan view of a further and preferred accessory 230 for smartphones, which is essentially a variation of the accessory 210 of FIGS. 20-22, also with two and only two assemblable components in the form of a smartphone case 211 and a camera control module 232, with an integral connector 250. The difference between this preferred accessory 230 and the accessory 210 of FIGS. 20-22 is that the connector 250 now includes a bayonet arrangement 270 for connecting the camera control module 232 to the case 211.

The bayonet arrangement 270 comprises a set of two bayonet projections 271 provided on the connector 250, which, as described above, is integrated into the camera control module 212. The bayonet projections 271 (which could be just one or more than two, in alternative arrangements) have in this arrangement portions having generally arcuated shape and are disposed at an angle of 180 degrees (ie, opposite one another) with respect to a notional centre C of the connector 250. Other shapes are however possible, for example cylindrical.

The bayonet projections 271 are designed to engage with a corresponding set of two bayonet openings or sockets 272 formed on the case 211, as also shown in FIG. 25. The bayonet sockets 272 are also generally arcuated in shape, to match the arcuated shape of the bayonet projections 271, so as to make possible inserting the projections 271 in the corresponding sockets 272. In addition, latching cut-outs 274 are also formed contiguous to the bayonet sockets 272, such that when the projections 271 are received in the slots 272 (as shown in FIG. 28), the camera control module 232 can be affixed to the case 211 by twisting it clockwise to the angular position shown in FIG. 29. This is made possible by the three-dimensional profile of the bayonet projections, which however is not visible in FIG. 25. Once the camera control module 232 has been attached to the case 211, the reconfigurable camera grip 236 can be retracted to a stowed-away configuration as shown in FIG. 28, and deployed again as a camera grip 236 and/or as a kickstand 217, as required by the user.

A recess 280 is formed on the back face of the case 211 to receive the reconfigurable camera grip 236 in the folded configuration of FIG. 28, to ensure a compact profile of the accessory 230 in the folded or stowed-away configuration, but also to prevent accidental rotation of the bayonet arrangement 270 of the connector 250, which could disengage the camera control module 232 from the accessory 210 and, thus, from the smartphone 201.

The reconfigurable camera grip portion 226, 236 of the assemblable camera control module 232 is generally shaped as a parallelepiped, and preferably as a parallelepiped with right angles, having a width that generally corresponds to, or is less than, a width of the case 211 or of the portable electronic device 201, wherein said widths are in a transversal direction of the portable electronic device 201.

The reconfigurable camera grip portion 226, 236 has a length that generally corresponds to half, or less than half, a length of the case 211 or of the portable electronic device 201, wherein said lengths are in a longitudinal direction of the portable electronic device 201.

The reconfigurable camera grip 226, 236 has a depth that generally corresponds to, or exceeds, a depth of the case 211 or of the portable electronic device 201, wherein said depths are in an out-of-plane direction of the portable electronic device 201.

FIG. 29 shows yet a further and more preferred accessory 230, very similar to that of FIGS. 25-28. This accessory 230 also comprises two and only two assemblable components, in the form of a case 211 and a camera control module 232 which has a reconfigurable camera grip portion 226 that may be reconfigured to provide a camera grip 236 and/or a kickstand 217 for the portable electronic device 201. However, the connector 250, which is provided here as part of the camera control module 232, comprises a single mating projection (not shown) which is adapted for fitting into a single socket 272 (of circular shape) formed on the back face of the case 211, as shown in FIG. 29. The connection may be aided by complementary magnets (not shown) provided, respectively, on the connector 250 and on the case 211. The magnets could be deployed in conjunction with any of the connectors described herein.

Accordingly, the camera control module 232, and with it, the reconfigurable camera grip portion 226, and the camera grip 236, are collectively reorientable on the case 211, and this operation requires rotating the camera control module 232 around a notional z-axis perpendicular to a notional x-y plane defined by the case 211 and/or the portable electronic device 201. The camera control module 232 in this more preferred accessory 230 can be reoriented relative to the case at any angle around said z-axis. However, this relative rotation could be limited to within a specified range of angles. Such operation of the camera control module 232 is made possible by the type of connection formed between the case 211 and the connector 250, via the circular socket 272. However, it will be appreciated that other connections are possible which may provide the same functionality. One such connection is, for example, shown in FIG. 7 and is described hereinabove.

The preferred accessory 230, in other words, includes a camera control module 232 which is not only reconfigurable (in that it comprises a reconfigurable portion 226) to provide a reconfigurable camera grip 236, but the camera grip 236 is also orientable on the case such that it may be used, for example, in portrait or landscape picture-taking modes. The preferred accessory 230, when the camera module 232 is assembled to the case 211, defines not just one but two hinges 206, 207 that operate around respective axes of rotation, one perpendicular (z axis) and one parallel (y axis) to the x-y plane defined by the case 211 or the smartphone 201, as shown in FIG. 29.

FIG. 30 shows the accessory 230 of FIG. 29, in an assembled status, with the camera grip 236 reconfigured for taking photos with the smartphone 201 in portrait orientation. This is achieved by rotating the reconfigurable camera grip 236 such that it is now at a right angle with respect to a longitudinal direction defined by the smartphone 201 and/or by the case 211 (x axis). It will further be appreciated that the reconfigurable camera grip 236 can in addition be used as a kickstand 217, and that this can be done both in portrait or landscape configurations by extending the camera grip 236 around the hinge 206 of the camera control module 232, away from the case 211. Such operation of the hinge 206, to extend the reconfigurable camera grip portion 226 away from the case 211 to provide a camera grip 236 and/or kickstand 217 may result into a better grip and/or better support for the camera smartphone 201 for taking photos.

Figure 31A:
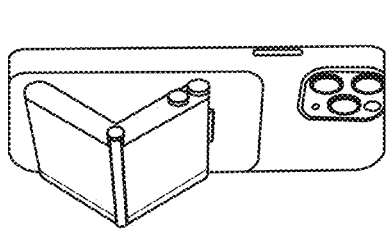
Figure 31B:
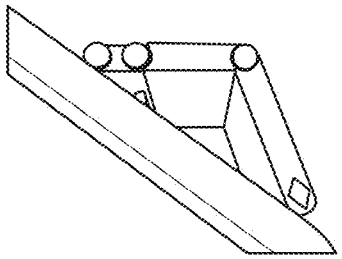
Figure 31C:
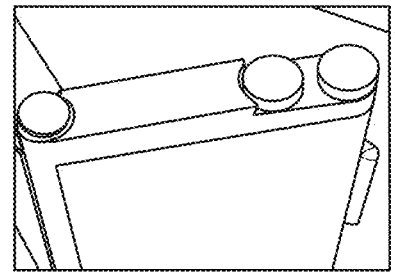
Figure 31D:
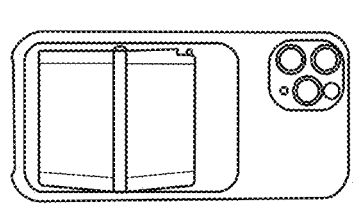
Figure 31E:
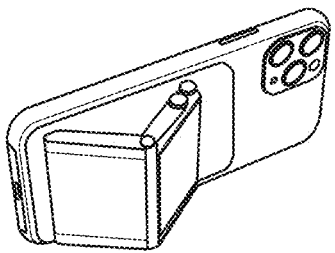
Figure 31F:
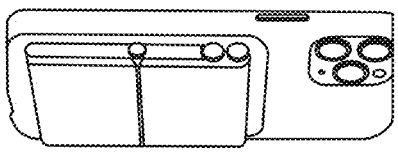
Figure 31G:
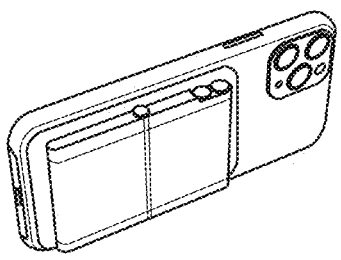
Figure 31H:
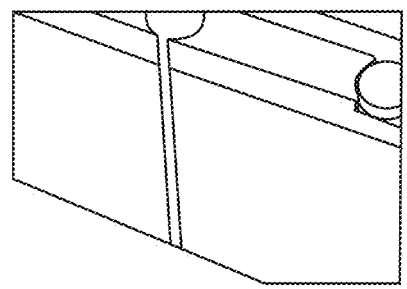
Figure 31I:
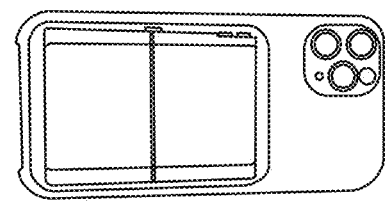

FIG. 31 relates to yet a further accessory for smartphones, similar to that of FIGS. 11A and 11B, which is shown in various configurations and from various viewpoints according to FIGS. 31a-31i. In FIG. 31a a reconfigurable camera grip of the accessory is deployed to provide a camera grip such that a user would be able to grip the smartphone in a way similar to that of a traditional camera. FIG. 31a alongside FIGS. 31b, 31c and 31e also reveals a slightly different arrangement of controls compared to that shown in FIGS. 11A and 11B, for example. The reconfigurable camera grip comprises two hinged panes, as shown in FIG. 31d. The left pane comprises a fixed hinge, fixed with respect to the case. The right pane comprises a movable hinge, in that this hinge is movable with respect to the case, and a sliding connection, opposite the movable hinge, on the other side of the pane. The camera control module is incorporated into the left pane. However, it could similarly be incorporated into the right pane. To reconfigure the reconfigurable portions (left and right panes) of the camera control module as a camera grip, the user slides the right panel to the left to obtain the camera grip, or to the right to store away the reconfigurable camera grip, as shown in FIGS. 31g, 31h and 31i, respectively.

Figure 32C:
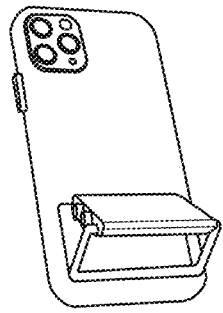
Figure 32F:
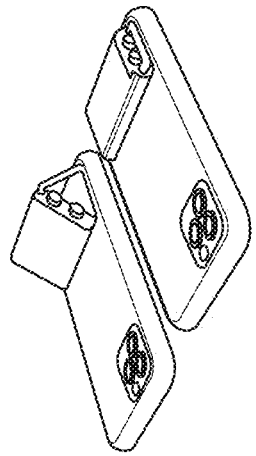
Figure 32B:
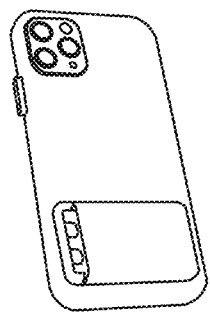
Figure 32E:
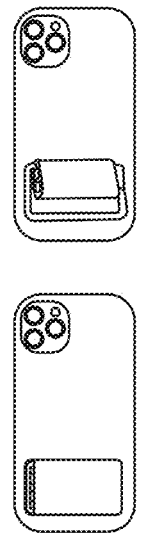
Figure 32A:
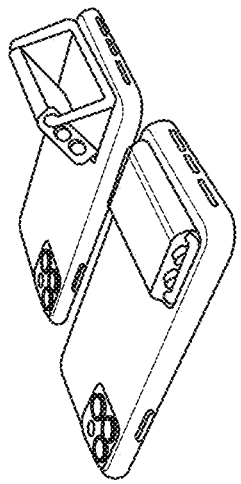
Figure 32D:
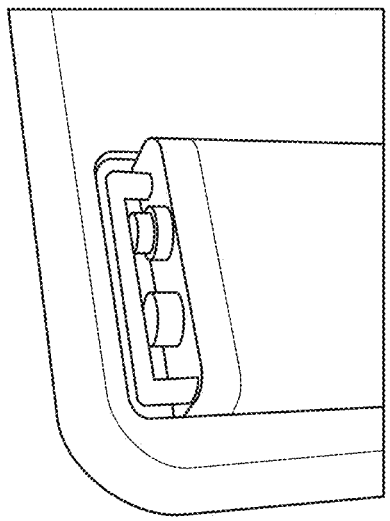

FIG. 32 relates to yet a further accessory for smartphones, similar to those of FIGS. 11A, 11B and 31a-31i, also shown in various configurations and from various viewpoints, as shown in FIGS. 32a-32f. In FIG. 32a, the reconfigurable camera module is shown in both retracted and deployed configurations. A wire bracket supports the camera control module in the deployed configuration, as best shown in FIG. 32c. The wire bracket is hinged at one end to the reconfigurable camera control module, and is slidable on guides at the other end, such that when the reconfigurable camera control module is pulled outwardly from the rest position (shown in FIG. 32b) by the user, the slidable end of the wire bracket slides outwardly (to the left, as seen in FIG. 32b) until it locks in place to support the extended camera grip. It will be appreciated that the reconfigurable camera grip portion and the wire bracket of this accessory work together as an overcentre mechanism.

The accessories described herein may each be provided with one or more camera grip configuration stabilisation features, or in other words one or more camera grip configuration retention means. Accordingly, the camera grip portion of the accessory may be configured in a required or desired configuration, and the one or more camera grip configuration retention means may act to retain the camera grip portion in that configuration. These features or means will now be exemplified in connection with FIGS. 33-35, but it will be understood that the concept is of more wide application.

FIGS. 33a and 33b show yet a further accessory for smartphones, similar to that of FIGS. 25-29. However, this accessory differs from the earlier accessories in that it comprises a camera-grip stabilisation lip 301 formed on an underside of the camera-grip portion of the accessory (i.e. the lip 301 is formed on an inner face thereof, which in-use faces the case component of the accessory), which lip 301 is shaped to engage a corresponding camera-grip stabilisation cut-away 302 formed on a camera grip facing side of the case of the accessory. In FIG. 33a, the camera-grip stabilisation lip 301 and cut-away 302 are disengaged, while the camera grip is deployed to provide a kick-stand, as previously described. In FIG. 33b, the lip 301 and cut-away 302 are engaged; this helps the camera grip portion lie essentially flat against the case in the retracted position, and in addition prevents any undesired sideway 'wobble' motion of the camera grip portion on the case.

FIGS. 34a, 34b and 34c illustrate a further camera-grip stabilisation feature provided on the accessory of FIGS. 33a and 33b. This feature is a debossment 303, 304 provided on an internal face of a recess, which recess serves to rotatably connect the camera grip portion with respect to a connector portion of the accessory, as described herein. The debossment 303, 304 is formed by a semi-spherical dimple or cavity 303 and an arcuate groove 304, both provided on said recess face, as shown. The debossment 303, 304 is designed to receive a corresponding embossment 305 (this is shown in FIGS. 35a to 35d). The embossment 305 is initially received in the cavity 303. A resistance must be overcome to rotate the camera grip portion such that the embossment 305 may be first removed from the cavity 303 and then received in the arcuate groove 304, where it is free to move along the arcuate recess 304 during rotation of the camera grip portion around the connector to reposition the camera grip portion from the retracted position to the deployed (i.e. kick-stand) position. The cavity 303 may accordingly ensure (if the cavity 303, the groove 304 and the embossment 305 are the only camera-grip configuration stabilisation features), or help to ensure (if the lip 301 and cut-away 302 are also provided), that the camera grip portion is retained in a flat and stable configuration on the camera case, until the user decides to deploy the camera grip portion in the kick stand configuration. It will be clear that the debossment and embossment features 303, 304, 305 and the lip and cut-away features 301, 302 can be alternative or complementary. Further, it will be clear that the same results can be achieved irrespective of the described and shown precise shape and configuration of these features, and their location. For example, it will be appreciated that the embossment may be provided on the camera grip portion, and the debossment may be provided on the connector portion. Other locations are possible.

With reference to FIGS. 35a, 35b, 35c and 35d, we can see that the embossment 305, which is provided on a shoulder of the connector (which, in use, locates opposite to the above described recessed face of the camera grip portion) is not distant from a notional axis of rotation defined by the hinge formed by the connector and camera grip portion when they are coupled or assembled. The embossment 305 takes the shape, in this accessory, of a semi-spherical projection. Other shapes would of course be possible. The material of which the embossment 305 is made can be the same material of which all the connector is made. However, as it can be appreciated, it will be important that this material, which can for example be a plastic, or other polymeric material, have a sufficient compliance so as to allow the embossment 305 to deform sufficiently to transfer from the cavity 303 to the arcuate groove 304. If this material is relatively rigid, then such compliance may be provided in relation to the material of which the body of the camera grip portion is made. This effect can be achieved as a combination of the characteristics of the material and geometry of the embossment 305, the cavity 303 and the groove 304, and the components on which they are provided. All dimensions in FIGS. 34a to 34c and 35a to 35d are in millimetres.

The above detailed description describes a variety of exemplary arrangements of and methods of using an accessory for controlling a camera incorporated into a portable electronic device and/or an associated camera control module. However, the described arrangements and methods are merely exemplary, and it will be appreciated by a person skilled in the art that various modifications can be made without departing from the scope of the appended claims. Some of these modifications will now be briefly described, however this list of modifications is not to be considered as exhaustive, and other modifications will be apparent to a person skilled in the art.

The controller 100 has been described in the above description as being part of the case or of any of the control modules described herein. In a modification of the concepts described herein, it is possible to provide the controller distributed across said components or parts.

In the above description, the term "accessory" has been used in connection with a product comprising a case for the underlying portable electronic device with camera. It will be appreciated, however, that the term "accessory" could likewise refer to any of the control modules described above, irrespective of the presence of a case integrated with, or attachable to, the control modules.

While various specific combinations of components and method steps have been described, these are merely examples. Components and method steps may be combined in any suitable arrangement or combination. Components and method steps may also be omitted to leave any suitable combination of components or method steps.

The described methods may be implemented using computer executable instructions. A computer program product or computer readable medium may comprise or store the computer executable instructions. The computer program product or computer readable medium may comprise a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). A computer program may comprise the computer executable instructions. The computer readable medium may be a tangible or non-transitory computer readable medium. The term "computer readable" encompasses "machine readable".

The singular terms "a" and "an" should not be taken to mean "one and only one". Rather, they should be taken to mean "at least one" or "one or more" unless stated otherwise.

The word "comprising" and its derivatives including "comprises" and "comprise" include each of the stated features but does not exclude the inclusion of one or more further features.

The above implementations have been described by way of example only, and the described implementations are to be considered in all respects only as illustrative and not restrictive. It will be appreciated that variations of the described implementations may be made without departing from the scope of the disclosure.

It will also be apparent that there are many variations that have not been described, but that fall within the scope of the appended claims.

LIST OF REFERENCES

1 Camera smartphone (FIG. 11)
2 Camera lenses (FIG. 11)
3 First pane
4 Second pane
5 Third pane
6 Hinges
7 Guided hinge
8 Fixed hinge
9 Reconfiguration sensor (FIG. 11)
10 Accessory (FIG. 1)
11 Case for camera smartphone
12 Camera control module
13 Window for camera control module
14 One or more camera controls
15 Window for camera lenses
16 Shutter button
17 NFC tag
18 Zoom rocker lever
19 Combined shutter-and-zoom button
20 Camera settings button
22 Attachment sensor
24 NFC reader
26 Camera grip (static)
30 Accessory (FIG. 2)
32 Camera control module
36 Reconfigurable portion(s)
38 Camera grip (reconfigurable)
40 Flexible, concertina-type, element
40a Corner of flexible, concertina-type, element
40b Corner of flexible, concertina-type, element
40c Corner of flexible, concertina-type, element
40d Corner of flexible, concertina-type, element
40ab Side of flexible, concertina-type element
40cd Opposed side of flexible, concertina-type, element
42 Guides
44 Support structure
46 Strips
48 Live hinges
50 Accessory (FIG. 3)
52 Camera control module
54 Control panel
55 Camera settings dial
56 Slider
57 Link
58 Pivoted tab
60 Latch
69 Accessory (FIG. 11)
70 Accessory (FIG. 4)
72 Camera control module
80 Flexible band
81 Flexible band component
82 Flexible band component
83 Flexible band component
84 Flexible band component
87 Loop
90 Accessory (FIGS. 8 and 9)
91 Case for smartphone (with controller)
92 Camera control module with controls (FIG. 8)
93 Recess
94 Camera control module with grip, or camera grip module (FIG. 9)
95 Position sensor
96 Position sensor
97 Camera control module with controls and grip, or camera control and grip module (FIG. 10)
98 Case for camera smartphone (dummy)
99 Accessory (FIG. 10)
100 Controller
110 Battery
120 Providing accessory
130 Mounting accessory to smartphone
140 Checking if camera of device responds to accessory (check link between accessory and camera)
150 Controlling camera using accessory
160 Generating camera control initiation command
170 Transmitting and receiving camera control initiation command
201 Camera smartphone
206 Hinge (for reconfiguration of the camera grip)
207 Hinge (for orientation of the camera grip)
210 Accessory
211 Case for camera smartphone
211i Inner case shell
211o Outer case shell
212 Camera control module
215 Window for camera lenses
217 Kickstand
226 Reconfigurable camera grip portion
230 Accessory
232 Camera control module
236 Camera grip
250 Connector
251 Connector base
252 Connector protruding portion
253 Tongue
254 Slot
260 Latch or release mechanism
261 Operating arms
262 Latching projections
263 Spring
264 Recess
265 Opening
267 Heads
268 Housing
270 Bayonet arrangement
271 Bayonet projections
272 Bayonet sockets
274 Bayonet cut-outs
280 Recess for camera control module
301 Lip
302 Cut-away
303 Dimple
304 Groove
305 Embossment

The invention claimed is:

1. An accessory for controlling a camera incorporated into a portable electronic device, the accessory comprising:
two or more assemblable components, wherein at least one of said assemblable components is provided in the form of, or comprises, a case for the portable electronic device, and at least one other of said components comprises:
a camera grip reconfigurable between a first, stowed position, and a second, deployed position, wherein in the second, deployed position the camera grip provides a kickstand for the portable electronic device, the camera grip comprising:
    a controller configured to control the camera, and
    one or more camera controls, operably connected to the controller, for controlling the camera.

2. The accessory of claim 1, wherein the one or more camera controls comprise one or more of:
    a shutter button;
    a combined two-step focus-and-shutter button;
    a camera settings function button;
    a camera settings function dial;
    a zoom rocker lever; and
    a zoom dial,
    wherein one or more of the shutter button, the combined two-step focus-and-shutter button, the camera settings function button, the camera settings function dial, the zoom rocker lever, and the zoom dial are provided on a control panel.

3. The accessory of claim 1, wherein the accessory comprises a reconfiguration sensor for sensing reconfiguration of the one camera grip, the reconfiguration sensor being operably connected to the controller.

4. The accessory of claim 3, wherein the accessory is configured such that reconfiguration of the camera grip causes the controller to send a control command to the portable electronic device and/or to receive a wake up command for awaking the controller from a sleep mode.

5. The accessory of claim 1, wherein the camera grip comprises one or more hinges.

6. The accessory of claim 2, wherein the accessory is configured such that actuation of at least one of the one or more camera controls causes the controller to send a control command to the portable electronic device to initiate camera control via the accessory and/or to receive a wake up command for awaking the controller from a sleep mode.

7. The accessory of claim 1, wherein the portable electronic device is a camera smartphone, and the case is provided in the form of a protective casing element for the camera smartphone.

8. The accessory of claim 1, wherein the component(s) provided in the form of, or comprising, the case define(s) a slot, recess or a window for receiving the camera grip.

9. The accessory of of claim 1, wherein the accessory comprises two or three assemblable components, wherein one of said assemblable components is provided in the form of, or comprises, said case and one other assemblable component comprises said camera grip and said controller, and wherein said two or three assemblable components also comprise a connector for assembling the assemblable components, wherein the connector is provided as a part of one of the two assemblable components, or is provided as said third assemblable component.

10. The accessory of claim 9, wherein said camera grip comprises one and only one reconfigurable portion, wherein the controller is accommodated within said reconfigurable portion.

11. The accessory of claim 10, wherein the camera grip is generally shaped as a parallelepiped, preferably as a parallelepiped with right angles, having a width that generally corresponds to, or is less than, a width of the case or of the portable electronic device, wherein said widths are in a transversal direction of the portable electronic device.

12. The accessory of claim 11, wherein the camera grip has a length that generally corresponds to half, or less than half, a length of the case or of the portable electronic device, wherein said lengths are in a longitudinal direction of the portable electronic device.

13. The accessory of claim 10, wherein the camera grip has a depth that generally corresponds to, or exceeds, a depth of the case or of the portable electronic device, wherein said depths are in an out-of-plane direction of the portable electronic device.

14. The accessory of claim 9, wherein the connector and the camera grip are hinged together, such that the camera grip may be rotated away from the case;
    such that the camera grip may be rotated away and click at selectable, predetermined angles of rotation, to retain said selectable, predetermined angles of rotation;
    such that the camera grip may be rotated away from the case up to a maximum angle of rotation of less than 90 degrees, or less than 60 degrees.

15. The accessory of claim 14, wherein the connector comprises one or more projections, such as bayonet projections, for connecting to respective one or more sockets, such as bayonet sockets, provided on the case;
    wherein said sockets are located generally centrally with respect to the case of the portable electronic device;
    wherein the connector and the case are additionally magnetically attached one to the other.

16. The accessory of claim 15,
    wherein said bayonet projections and sockets are designed such that said one other assemblable component is connectable to the case by inserting the one or more bayonet projections in the respective one or more bayonet sockets and by twisting the other assemblable component relative to the case,
    wherein said twisting comprises rotating the other assemblable component relative to the case by at least 30 degrees;
or,
    wherein said projections are spring-biassed, and said projections and sockets are designed such that said one other assemblable component is connectable to the case by actuating a release mechanism against a spring-bias, then inserting the one or more projections in the respective one or more sockets and then releasing said release mechanism.

17. The accessory of claim 9, wherein a back face of the case is recessed to accommodate at least partially the camera grip in a/the stowed configuration.

18. The accessory of claim 9, wherein the connector comprises a tongue for insertion into a corresponding slot formed on a side of the one or more reconfigurable portions.

19. The accessory of claim 9, wherein said camera grip is reorientable relative to the case.

\* \* \* \* \*